United States Patent
Finot et al.

(10) Patent No.: US 6,585,427 B2
(45) Date of Patent: Jul. 1, 2003

(54) FLEXURE COUPLED TO A SUBSTRATE FOR MAINTAINING THE OPTICAL FIBERS IN ALIGNMENT

(75) Inventors: Marc Finot, Palo Alto, CA (US); Marc Epitaux, Sunnyvale, CA (US); Jonas Webjorn, Fremont, CA (US); Jean-Marc Verdiell, Palo Alto, CA (US); Robert Kohler, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/885,240

(22) Filed: Jun. 19, 2001

(65) Prior Publication Data

US 2002/0025126 A1 Feb. 28, 2002

Related U.S. Application Data

(63) Continuation-in-part of application No. 09/390,945, filed on Sep. 7, 1999, and a continuation-in-part of application No. 09/229,395, filed on Jan. 11, 1999, now Pat. No. 6,207,950.

(51) Int. Cl.[7] .................................................. G02B 6/00
(52) U.S. Cl. ........................................................ 385/92
(58) Field of Search ............................. 385/92, 134, 89, 385/88, 14, 131, 132, 93, 94, 80, 83, 65; 257/81, 49

(56) References Cited

U.S. PATENT DOCUMENTS

| | | |
|---|---|---|
| 3,908,184 A | 9/1975 | Anazawa et al. |
| 4,114,177 A | 9/1978 | King |
| 4,119,363 A | 10/1978 | Camlibel et al. |
| 4,233,619 A | 11/1980 | Webb et al. |
| 4,357,072 A | 11/1982 | Goodfellow et al. |
| 4,893,901 A | 1/1990 | Taumberger |
| 4,896,936 A | 1/1990 | Stanley |
| 4,926,545 A | 5/1990 | Pimpinella et al. |
| 5,119,448 A | 6/1992 | Schaefer et al. |
| 5,123,074 A | 6/1992 | Yokota et al. |
| 5,132,532 A | 7/1992 | Watanabe |
| 5,163,108 A | 11/1992 | Armiento et al. |
| 5,195,155 A | 3/1993 | Shimaoka et al. |
| 5,553,180 A | 9/1996 | Belenkiy et al. |
| 5,569,958 A | 10/1996 | Bloom |
| 5,570,444 A | 10/1996 | Janssen et al. |
| 5,610,395 A | 3/1997 | Nishiyama |
| 5,619,609 A | 4/1997 | Pan et al. |
| 5,641,984 A | 6/1997 | Aftergut et al. |
| 6,027,254 A * | 2/2000 | Yamada et al. ............... 385/88 |
| 6,056,447 A * | 5/2000 | Caras ......................... 385/92 |
| 6,141,471 A * | 10/2000 | Agatsuma .................... 385/49 |
| 6,146,025 A * | 11/2000 | Abbink et al. ............... 385/88 |
| 6,222,967 B1 * | 4/2001 | Amano et al. ............... 385/49 |

* cited by examiner

Primary Examiner—Jean F. Duverne
(74) Attorney, Agent, or Firm—Blakely, Sokoloff, Taylor & Zafman LLP

(57) ABSTRACT

A flexure and package including the same are provided. In one embodiment, the flexure is coupled to a second optical element and a substrate to maintain the second optical element in alignment with a first optical element. The flexure comprises a body, a pair of front and back legs. The attachment of the rear legs to the substrate causes the flexure to move from a first flexure position to a second flexure position, the distance between the first flexure position and the second flexure position equaling an offset distance. A specified length of the body is chosen such that the offset distance causes a second offset distance of the second optical component held by the flexure, and this second offset distance is within a specified range. The second offset distance is equal to the difference between a primary second optical component position and a secondary second optical component position.

29 Claims, 31 Drawing Sheets

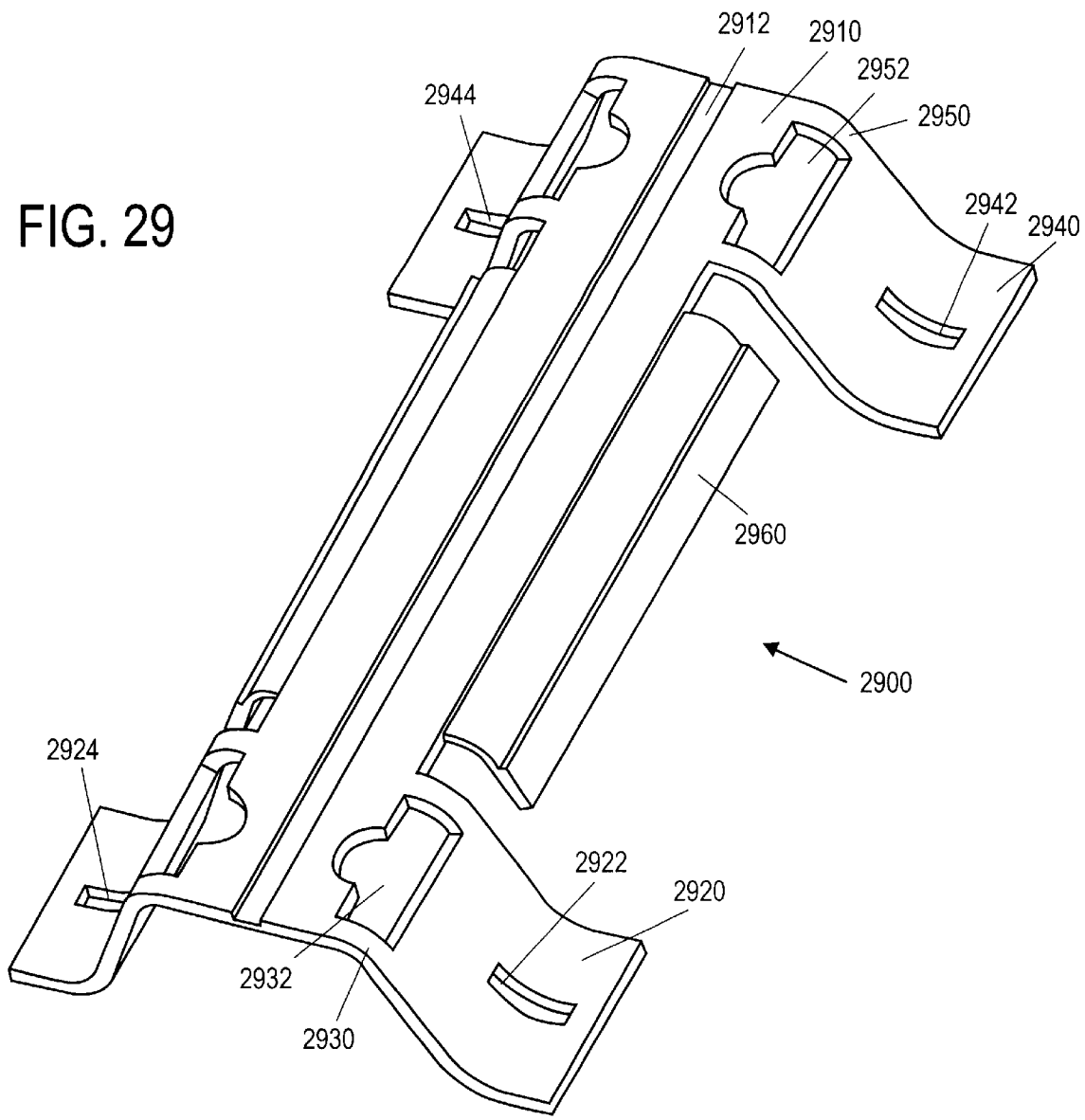

FLEXURE COUPLED TO A SUBSTRATE FOR MAINTAINING THE OPTICAL FIBERS IN ALIGNMENT

REFERENCE TO RELATED APPLICATIONS

This application is a continuation in part of the following U.S. patent applications: "OPTOELECTRONIC ASSEMBLY AND METHOD FOR FABRICATING THE SAME", application number 09/390,945, filed Sep. 7, 1999 and "OPTICAL ELECTRONIC ASSEMBLY HAVING A FLEXURE FOR MAINTAINING ALIGNMENT BETWEEN OPTICAL ELEMENTS", application number 09/229,395, filed Jan. 11, 1999.

FIELD OF THE INVENTION

The present invention relates generally to optoelectronic assemblies having optical components, and more particularly, to a flexure having a specified length to support and align optical components.

BACKGROUND

Sealed packages are necessary to contain, protect, and couple to optical fibers and electrically connect optoelectronic components. Optoelectronics packaging is one of the most difficult and costly operations in optoelectronics manufacturing. Optoelectronic packages provide submicron alignment between optical elements, high-speed electrical connections, excellent heat dissipation, and high reliability. Providing such feature has resulted in optoelectronic packages that are larger, costlier, and more difficult to manufacture than electronic packages. In addition, current designs of optoelectronic packages and associated fabrication processes are ill adapted for automation because today's high-performance butterfly packages are characterized by a large multiplicity of mechanical parts (submount, brackets, ferrules, etc.), three-dimensional (3D) alignment requirements, and poor mechanical accessibility.

U.S. Pat. No. 5,570,444 by Janssen discloses optically coupling optical fibers to injection lasers. The end of an optical fiber is held in alignment with an injection laser by securing the fiber to an elongate support member whose end nearer the injection laser is then laser beam welded to a pair of slide members that had been previously secured by laser beam welding to leave a precisely dimensioned small gap between the support and slide members. The end of the support member remote from the injection laser is secured by laser beam welding to a plastically deformable saddle. No pressure is applied to the elongated support member or saddle, and the arms and feet of the saddle do not spread apart as the fiber is secured and aligned. In addition, the fiber is aligned before the end of the support member is welded to the plastically deformable saddle. Accordingly, this method does not allow for flexibility in adjusting the vertical height of the fiber after the support member is welded to the saddle.

U.S. Pat. No. 5,195,555 by Shimaoka discloses an optical coupling technique as well as a lens holder. The optical coupling apparatus includes a light emitting diode, a lens, an optical isolator, and an optical fiber disposed on a common optical axis. The individual optical elements are roughly adjusted in the respective positions and fixed. Then, a precise and final adjustment is effectuated by plastically deforming a portion of a holder for supporting the lens or the optical isolator and/or by adjusting inclination of the holder. However, the lens holder is secured without any application of pressure on the lens holder that would allow for flexibility in adjusting the vertical height of the lens after the lens holder has been secured. In addition, this apparatus uses numerous parts in complex three-dimensional arrangements and are unsuitable for automated assembly.

U.S. Patent No. 5,619,609 by Pan discloses an improved clip for supporting an end of an optical fiber relative to a mount surface. A sleeve is disposed over the optical fiber adjacent to its end. The clip comprises a clip body with an upper and lower surface, with a flange disposed adjacent to the lower surface. The flange is affixable to the mount surface, and walls extend from the upper surface of the body to define a channel at which the clip is affixable about the sleeve. When the sleeve is affixed within the channel, the body rigidly couples the sleeve to the flange, thereby avoiding misalignment between the optical fiber and any optical device which is on or supported by the mount surface. Accordingly, this does not allow for flexibility in adjusting the vertical height of the fiber when aligning the fiber with any optical device supported by the mount surface.

Embodiments of the present invention overcome the limitations of the prior art.

SUMMARY OF THE INVENTION

Accordingly, a flexure and package including the same are described. In one embodiment, the flexure is part of a package that includes a substrate, a first optical element, and a second optical element. The flexure is coupled to the second optical element and the substrate to maintain the second optical element in alignment with the first optical element. The flexure comprises a body, a pair of front legs, and a pair of back legs. The attachment of the rear legs to the substrate causes the flexure to move from a first flexure position to a second flexure position, the distance between the first flexure position and the second flexure position equaling an offset distance. A specified length of the body is chosen such that the offset distance causes a second offset distance of the second optical component held by the flexure, and this second offset distance is within a specified range. The second offset distance is equal to the difference between a primary second optical component position and a secondary second optical component position.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 29 illustrates an alternative embodiment of a flexure.

DETAILED DESCRIPTION

Figure 1:
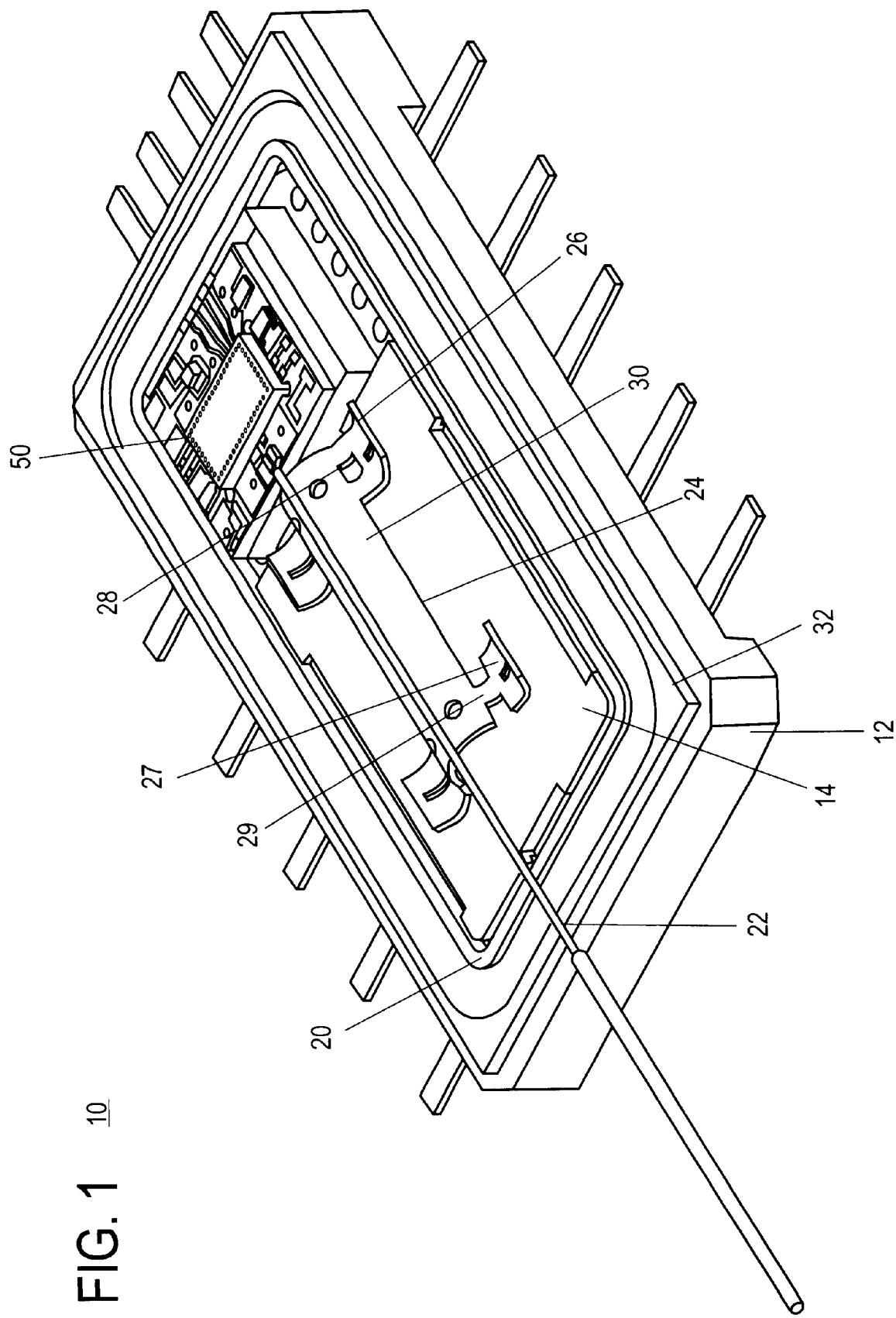
FIG. 1 illustrates one embodiment of an optoelectronic package.

An apparatus of a flexure is described. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

An optoelectronic package uses a flexure coupled to one or more optical components in order to support the component(s), as well as align one or more components in the package. In one embodiment, the flexure is attached (e.g., welded) to a portion of the interior of the package as part of the pick and place mounting method. In one embodiment, the alignment is 3D adjustable.

In high performance optoelectronic packages, critical optical elements require more precise placement than can be obtained with the combination of platform height control and two-dimensional pick and place. This is the case of single mode fibers, which have to be aligned within less than a micron precision to achieve high optical efficiency. In one embodiment, such components are mounted using a flexure that allows for vertical adjustment. In one embodiment, the flexure is made of thin spring steel that may have been etched or stamped, and then bent in a press. Alternative methods of making a flexure may include CDM, LIGA, waterjet, lasercutting, and electroforming.

The flexure may comprise of two or more legs that rest on a substrate or on each side of a frame. In one embodiment, the legs are joined by a body that supports or clamps the optical element.

The flexure may be designed so that in its natural (non-flexed) state, the optical axis of the optical component attached to the body rests slightly above the optical plane of the package. Final adjustment of the height is obtained by applying pressure to the flexure, therefore lowering the body height. Dragging the flexure in the plane parallel to the plane of a structure in a package (e.g., a frame) may be performed to correct the lateral position. When adequate alignment is reached, the legs are permanently attached to the frame or substrate. The attachment may be by, for example, laser welding, soldering or adhesive bonding. In another refinement of the flexure design, the flexure has more than two legs. The first pair of legs is attached to a structure in a package (e.g., a frame) after coarse optical alignment. The flexure is then finely realigned, using the residual flexibility left after the first two legs are attached. When a desired position is reached, the remaining legs are attached.

In one embodiment, a specified length of the body of the flexure may be chosen to ensure correct alignment of the optical component. The attachment of the rear legs to the substrate causes an offset of the flexure from a first flexure position to a second flexure position. This offset causes a second offset of the optical component from a first optical component position to a second optical component position. Accordingly, the length of the body is chosen to allow for these offsets and ensure that the second offset falls within a specified, acceptable range. The specified length thus assures correct alignment of the optical component.

FIG. 1 illustrates one embodiment of an optoelectronic assembly 10 with frame 32 and flexure 24. Assembly 10 also includes a substrate 12 with positioning floor 14, which may be substantially planar and the substrate 12 comprises an electronically isolating region with a low coefficient of thermal expansion. In one embodiment, a raised platform 20 is created on positioning floor 14.

In one embodiment, the package comprises a substrate having a positioning floor that provides a mounting surface and the package bottom wall. In one embodiment, the substrate and its positioning floor are substantially planar. In one embodiment, one or more raised platforms are also provided on the mounting surface. The raised platforms may be submounts made of a high thermal conductivity material, such as, for example, copper tungsten, Aluminum Nitride, Berillyum Oxide, Diamond, and Boron Nitride, attached to the floor of the substrate. The raised platforms maybe attached, for example, by soldering or brazing, or may even be part of the substrate material itself.

Optical elements, or components, are mounted on positioning floor 14 and platform 20. In one embodiment, a micro-isolator 50 is mounted on the platform 20. In an alternative embodiment, a transmitter lens is mounted on substrate 12, and an edge emitting optoelectronic element, such as, for example, a laser diode, is mounted on platform 20. In another alternative embodiment, the package includes a receiver with an optical receiving device, (e.g., a photodetector) mounted on platform 20.

An optical element 22 is attached to flexure 25 by, for example, soldering, brazing or welding. In one embodiment, flexure 24 comprises two legs 26 and 27, a body 30, and two thinned regions 28 and 29 at the junction of legs 26 and 27 and body 30. The thinned regions 28 and 29 shown have more spring than the rest of the legs 26 and 27 although the entire length of each leg 26 and 27 act as a spring. In one embodiment, element 22 is a single mode optical fiber but it may be any element that requires optical alignment with other optical elements (e.g. an isolator).

The frame 32 may be attached to substrate 12. The ends of legs 26 and 27 are attached to the frame 32. In one embodiment, the frame 32 has a groove. The groove permits the hermetic passage of the fiber 22 to the outside of the package.

In one embodiment, a cap may be attached to the frame 32, thereby creating an airtight seal. In one embodiment, the cap has a top hat shape and a peripheral lip that can be hermetically sealed to the outside portion of the frame 32 and fiber 22. The hermetic seal may be created by a process such as seam welding, soldering or adhesive bonding.

Figure 2:
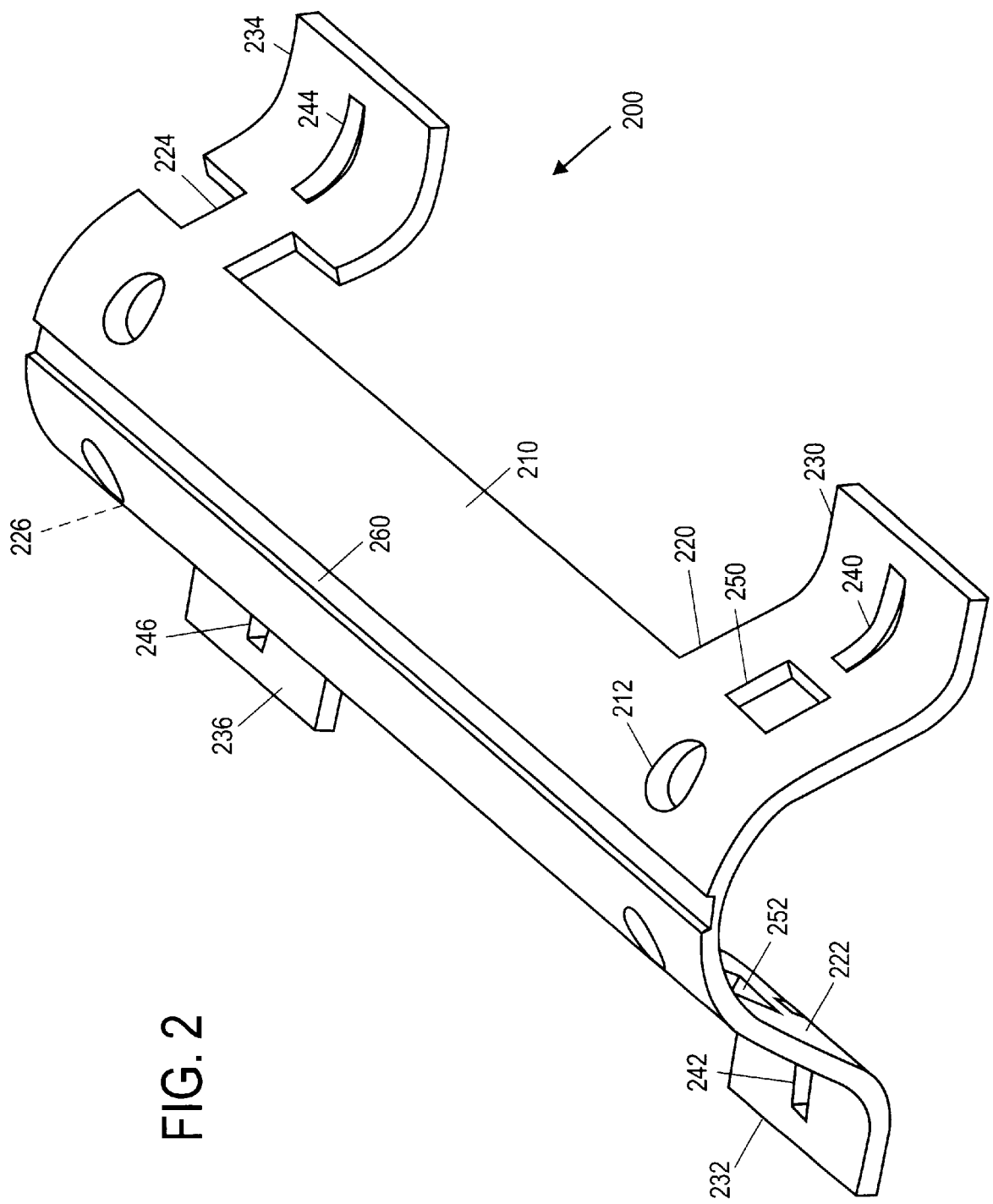
FIG. 2 illustrates one embodiment of a flexure.

FIG. 2 illustrates one embodiment of a flexure. Referring to FIG. 2, the flexure 200 includes a body 210, multiple legs 230, 232, 234, and 236, and multiple thinned regions 220, 222, 224 and 226. The body 210 has a circular segment shape. In alternative embodiments, the body may be another shape. The front pair of legs 230 and 232 are coupled to the body 210. The thinned regions 220 and 225 include a first and a second post for each thinned region by thinning sections 250 and 252. The thinned regions 224 and 226 include one post where sections are cut out on either side of each leg 234 and 236. In FIG. 2, the front pair of thinned regions 220 and 222 are smaller in total area than the back thinned regions 224 and 226 because sections have been removed created regions 250 and 252. This provides additional freedom of movement to the body 210 after the flexure 200 has been connected (e.g., welded) to a structure in a package (e.g., a substrate). An additional section to the right of region 250 may also be removed to add additional freedom of movement. This additional freedom of movement may be used to align an optical fiber (or other component) coupled to the flexure 200 after welding the front set of legs 230 and 232, yet before welding the back set of legs 234 and 236. This additional removal may occur after legs 230 and 232 have been attached in the package.

In the embodiment shown in FIG. 2, the body 210 also includes alignment apertures 212. These apertures 212 allow the flexure 200 to be positioned by picking up the flexure 200 using the alignment apertures 212 in the body 210 and placing the flexure 200 in a desired position. In alternative embodiments, the body may not have any alignment apertures, just one alignment aperture, or more than one alignment aperture.

Legs 230, 232, 234, and 236 also include apertures in the form of slots 240, 242, 244, and 246. The slots provide the benefit of a longer surface area for connection in the package. For example, after the flexure has been located onto the substrate and pressed toward the substrate in order to obtain optical alignment of the optical components, the legs spread out. Because the legs are spread farther apart, there is a greater likelihood that a portion of the slot (because of its length) will remain in contact with the substrate. This is as opposed to having a circular hole as the connection point. When the feet only have use of a circular hole as a contact point, it is possible that after the flexure is pressed towards the substrate, the hole may not be in direct contact with the substrate any longer, which makes welding more difficult. A spot weld is made between each pair of slots 240, 242, 244, and 246 using a laser pulse to connect the flexure to the substrate. Body 210 also includes an optical component holder in the form of a fiber groove 260 for placement of the fiber.

Figure 3:
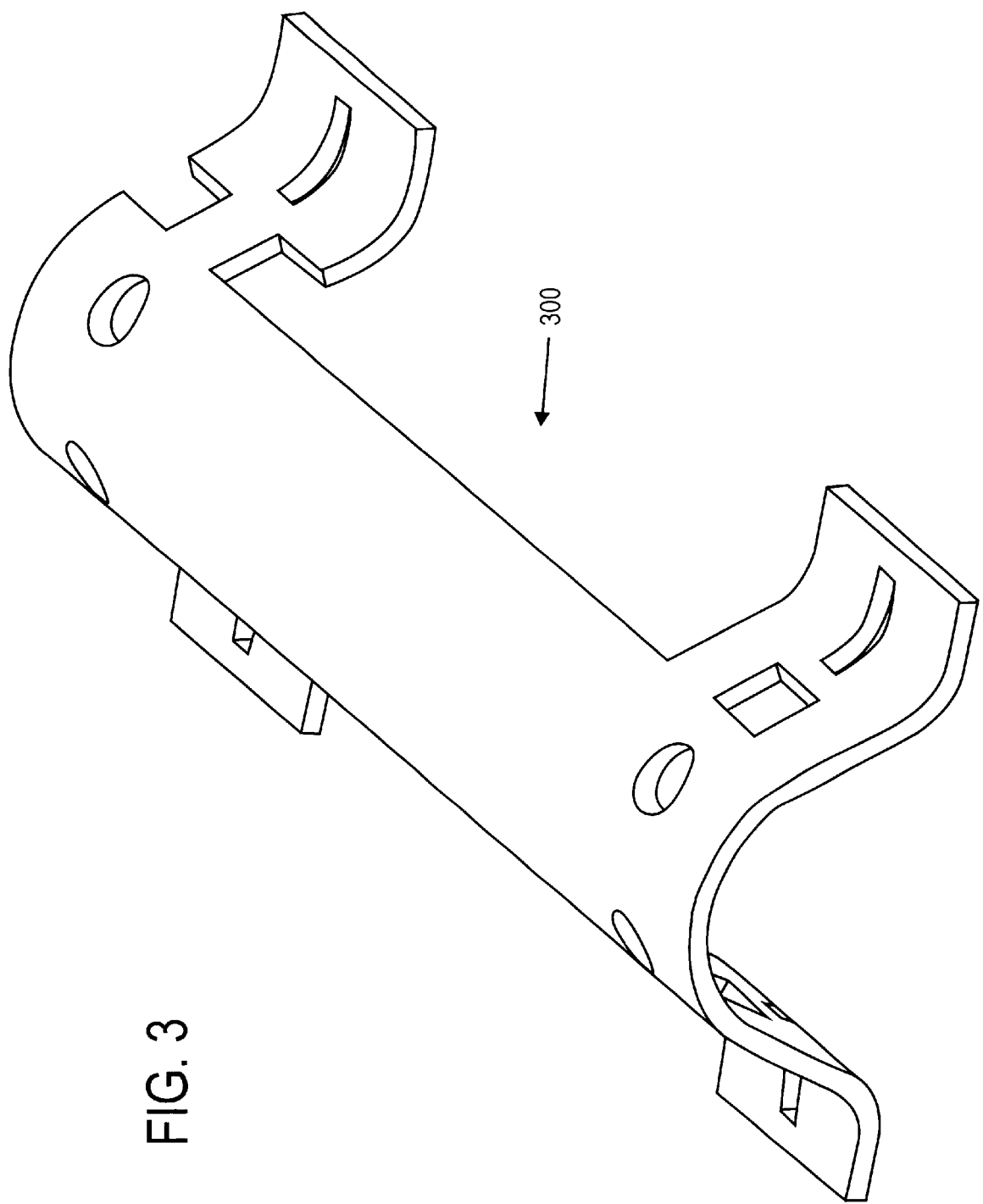
FIG. 3 illustrates an alternative embodiment of a flexure.

FIG. 3 illustrates an alternative embodiment of the flexure shown in FIG. 2 where the flexure 300 does not include a fiber groove 260 for placement of the fiber. The optical component (e.g., fiber) coupled to the flexure 300 may be mounted (e.g., soldered, glued, etc.) on the underside portion of the flexure 300 facing the substrate or on top of the flexure 300. In alternative embodiments, the mounting of the optical component to the flexure may be performed by other methods such as, for example, brazing, clamping, and snapping.

Figure 4:
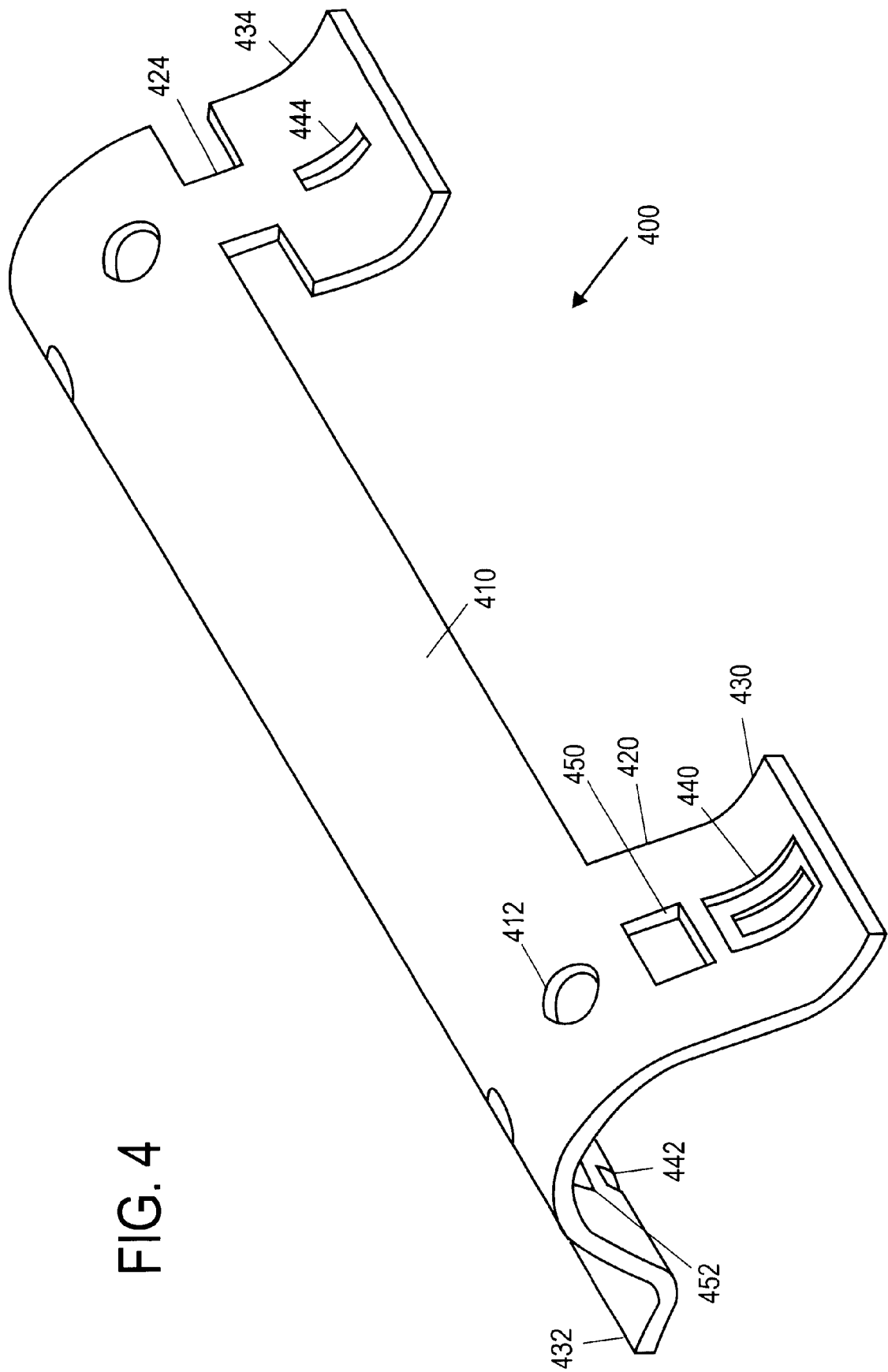
FIG. 4 illustrates an alternative embodiment of a flexure.

FIG. 4 illustrates an alternative embodiment of the flexure 200 shown in FIG. 2. The flexure 400 includes a body 410, a pair of front legs 430 and 432, and a pair of back legs 434. The flexure 400 includes thinned regions 420 and 424. Thinned region 420 include a first post and a second post where sections 450 on either side are thinned. In this embodiment, the flexure 400 is similar to flexure 200 in FIG. 2, except the slots 440 and 442 in the front legs 430 and 432 are different from the slots 240 and 242 in the flexure 200 of FIG. 2. In the embodiment shown in FIG. 4, the slots 440 and 442 are made of multiple layers.

Figure 5A:
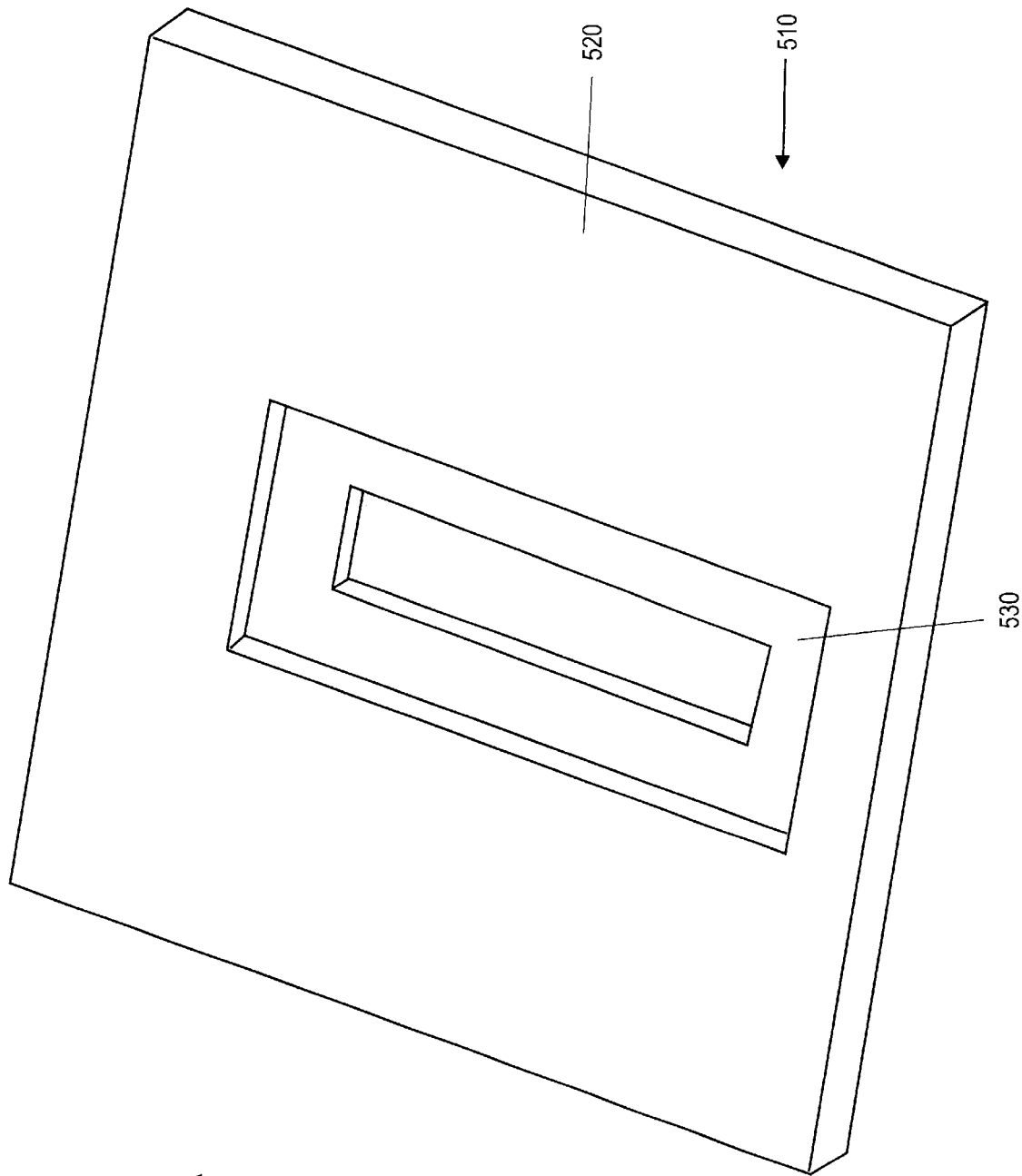
FIG. 5a illustrates one embodiment of a slot.

An exploded view of this embodiment of the slot 440 may be seen in FIG. 5a. The slot 510 includes the slot 510 includes a surface 520 having an etched region 530. The etched region 530 includes an aperture. This type of slot structure, namely the flat bottom surface of the legs, improves the connection between the flexure and the substrate. This slot structure also allows access for welding.

Figure 5B:
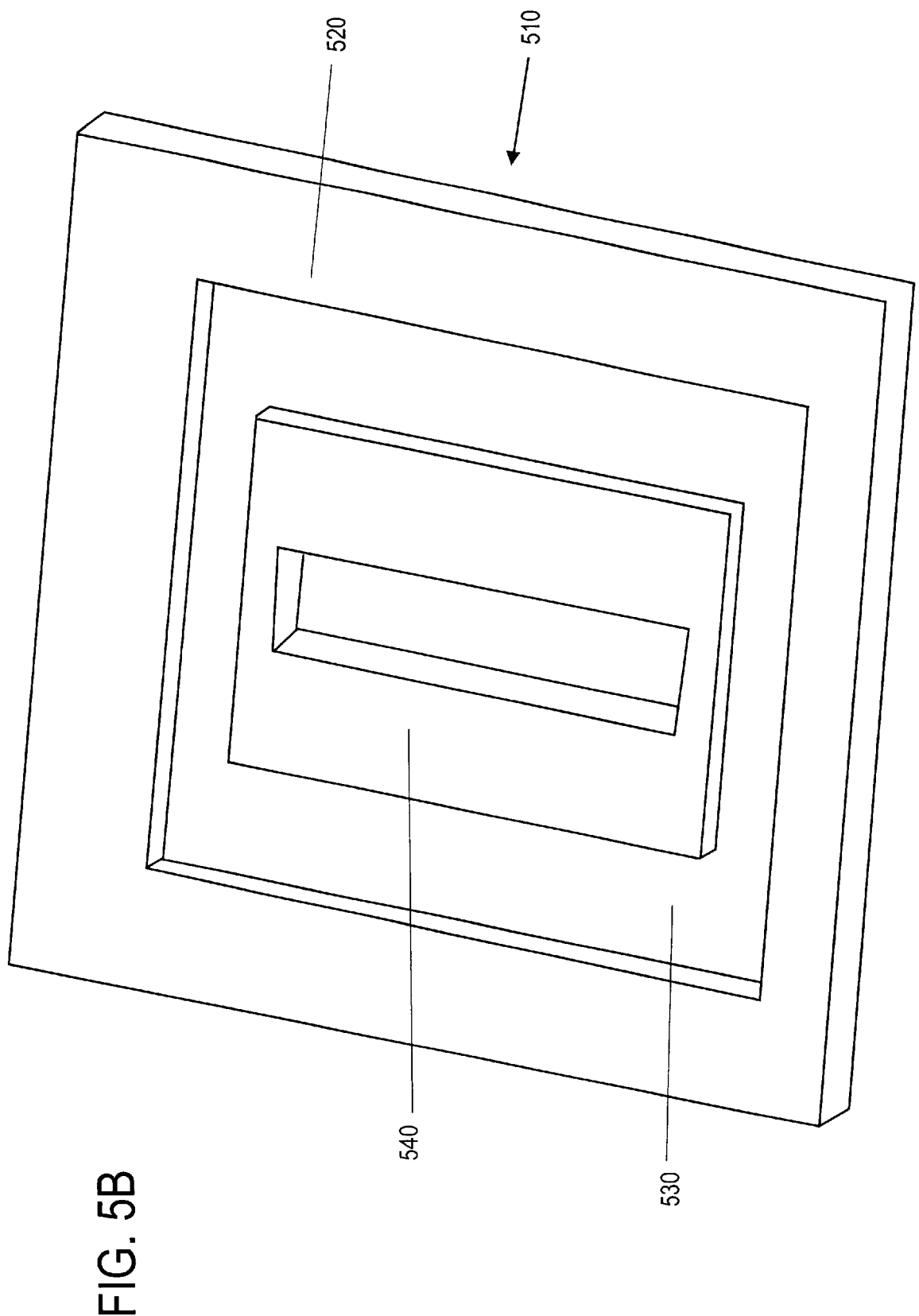
FIG. 5b illustrates an alternative embodiment of a slot.

An exploded view of an alternative embodiment of a slot may be seen in FIG. 5b. The slot 510 includes a surface having an etched region 530. The etched region 530 divides the surface into a first surface 520 and a second surface 540. The second surface 540 includes an aperture. The embodiments shown in FIGS. 5a and 5b provide different degrees of flexibility. Both embodiments improve the connection between the flexure and the substrate.

Figure 5C:
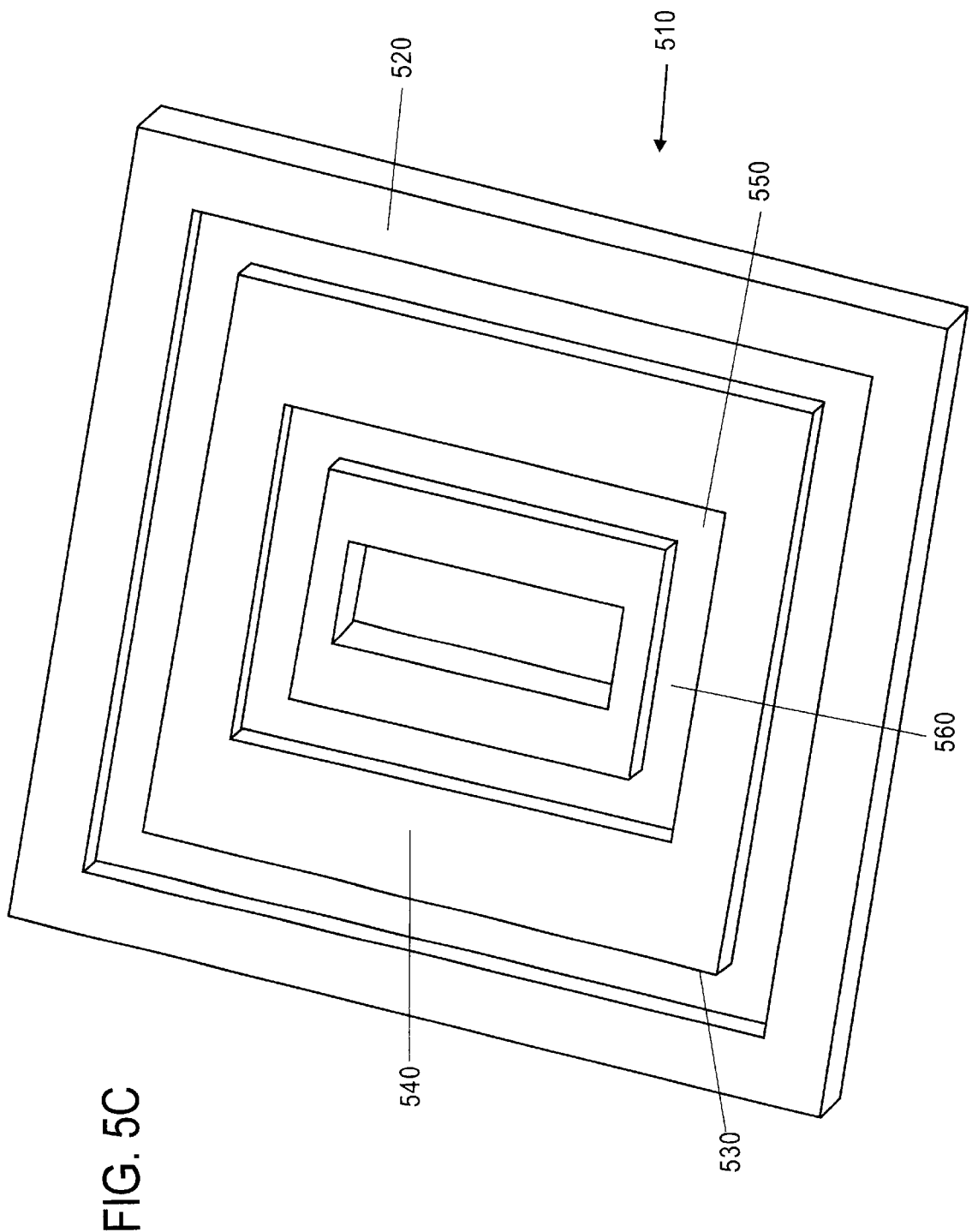
FIG. 5c illustrates an alternative embodiment of a slot.

An exploded view of an alternative embodiment of a slot may be seen in FIG. 5c. The slot 510 includes a surface having a first etched region 530 and a second etched region 550. The first and second etched regions 530 and 550 divide the surface into a first surface 520, a second surface 540, and a third surface 560. The third surface 560 includes an aperture. The embodiments shown in FIGS. 5a, 5b, and 5c provide different degrees of flexibility. These embodiments improve the connection between the flexure and the substrate.

Figure 6:
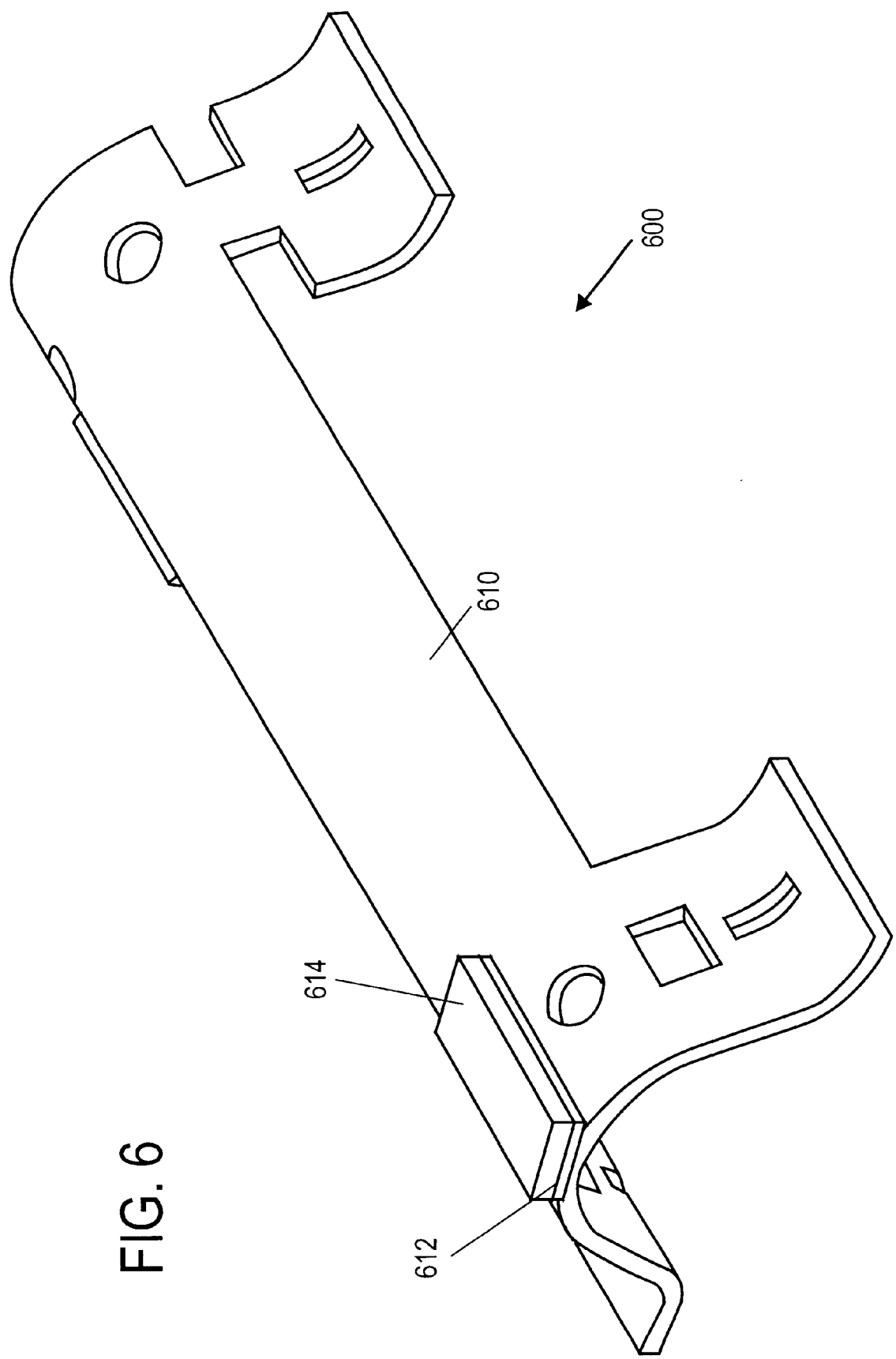
FIG. 6 illustrates an alternative embodiment of a flexure.

FIG. 6 illustrates an alternative embodiment of the flexure shown in FIG. 2. The flexure 600 in FIG. 6 is similar to the flexure 200 shown in FIG. 2. However, the flexure 600 is one piece in a two piece assembly. The other piece is a mounted piece 612 having a groove 614 that fits on top of the body 610. The mounted piece 612 does not run the length of the entire body 610, although it could be designed to do so. This embodiment allows the flexure 600 to hold an optical component such as an optical fiber. Also, the body 610 is not weakened by the groove 614. In addition, a flexure having a groove in alternative embodiments would also not be weakened by the grooves.

Figure 7:
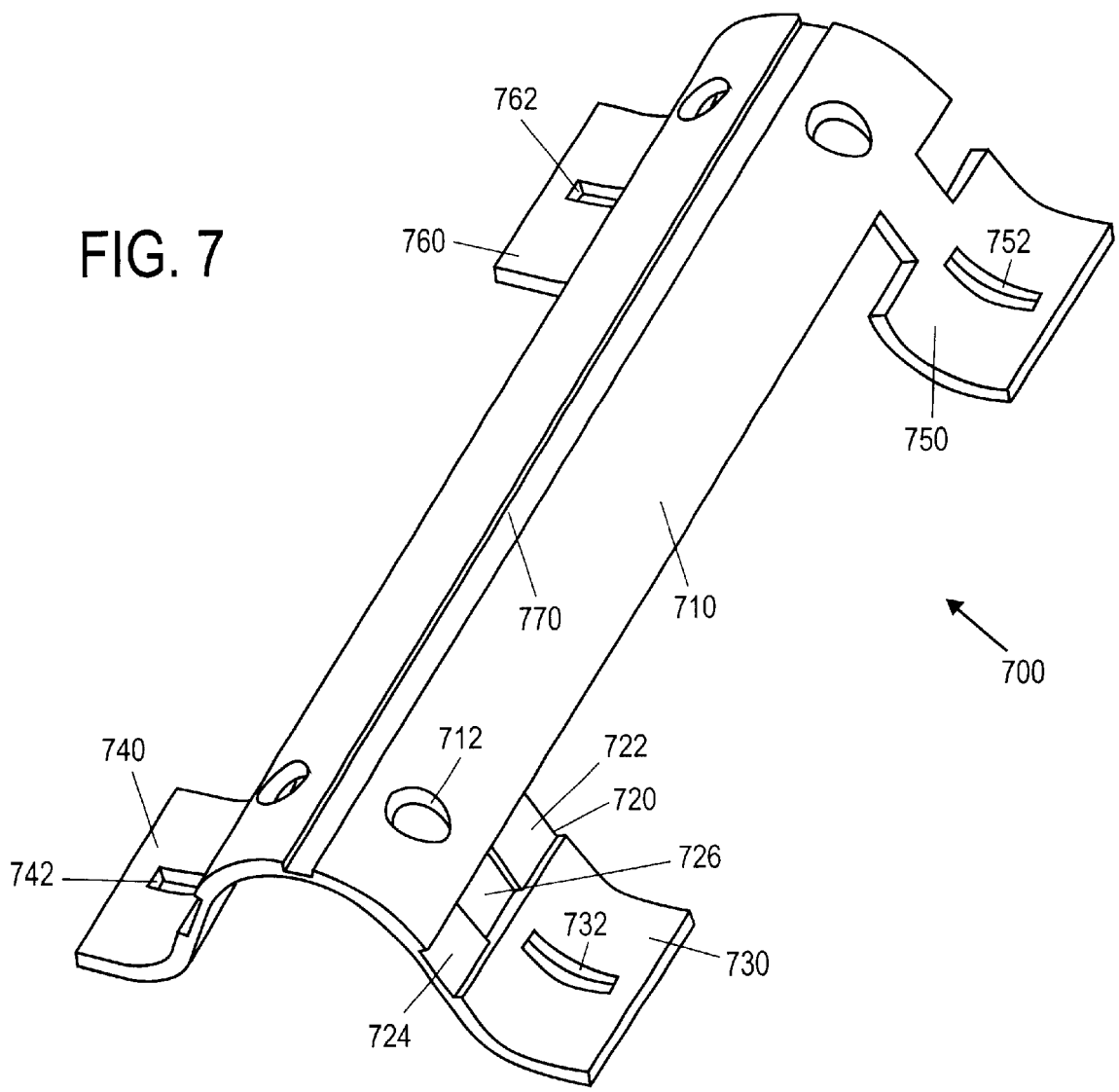
FIG. 7 illustrates an alternative embodiment of a flexure.

FIG. 7 illustrates an alternative embodiment of the flexure where certain regions are thinned. Sections 726 of thinned regions 720 are removed on both sides of the flexure 700, and sections 722 and 724 of front thinned regions 720 are thinned before the flexure 700 is coupled to the substrate. In an alternative embodiment, section 722 may be removed after the front legs 730 and 740 have been secured to the substrate. This facilitates movement of the flexure 700 prior to securing the back legs 750 and 760.

The embodiment shown in FIG. 7 also includes apertures in the form of slots 732 and 742 on the front legs 730 and 740, and slots 752 and 762 on the back legs 750 and 760. A groove 770 on top of the body 710 holds an optical component such as optical fiber. In FIG. 7, the body 710 has four apertures 712 for pick and place.

Figure 8:
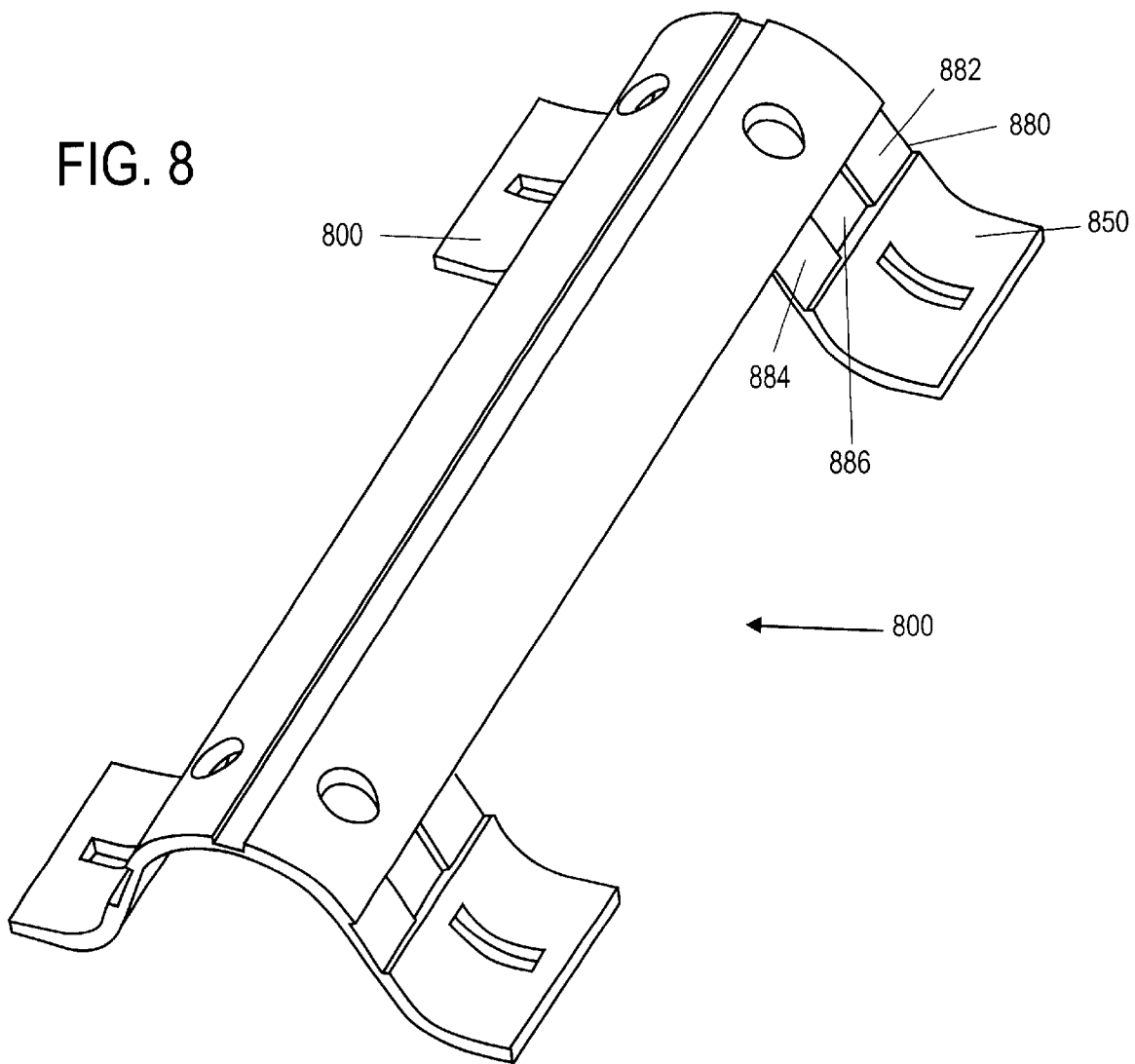
FIG. 8 illustrates an alternative embodiment of a flexure.

FIG. 8 illustrates an alternative embodiment of the flexure 700 shown in FIG. 7. Similar to the flexure 700 in FIG. 7, the flexure 800 in FIG. 8 also has sections cut out of front thinned regions on both sides of the flexure 800 and additional sections thinned in the front thinned regions to facilitate movement of the flexure 800. In addition, in FIG. 8, back thinned sections 882 and 884 of back thinned regions 880 are thinned and sections 886 are removed from the back thinned regions 880 on both sides of the flexure 800. This facilitates movement of the flexure 800. The thickness is reduced to optimize the stiffniess of the flexure. This, in turn, affects the bending of the flexure during alignment.

Figure 9:
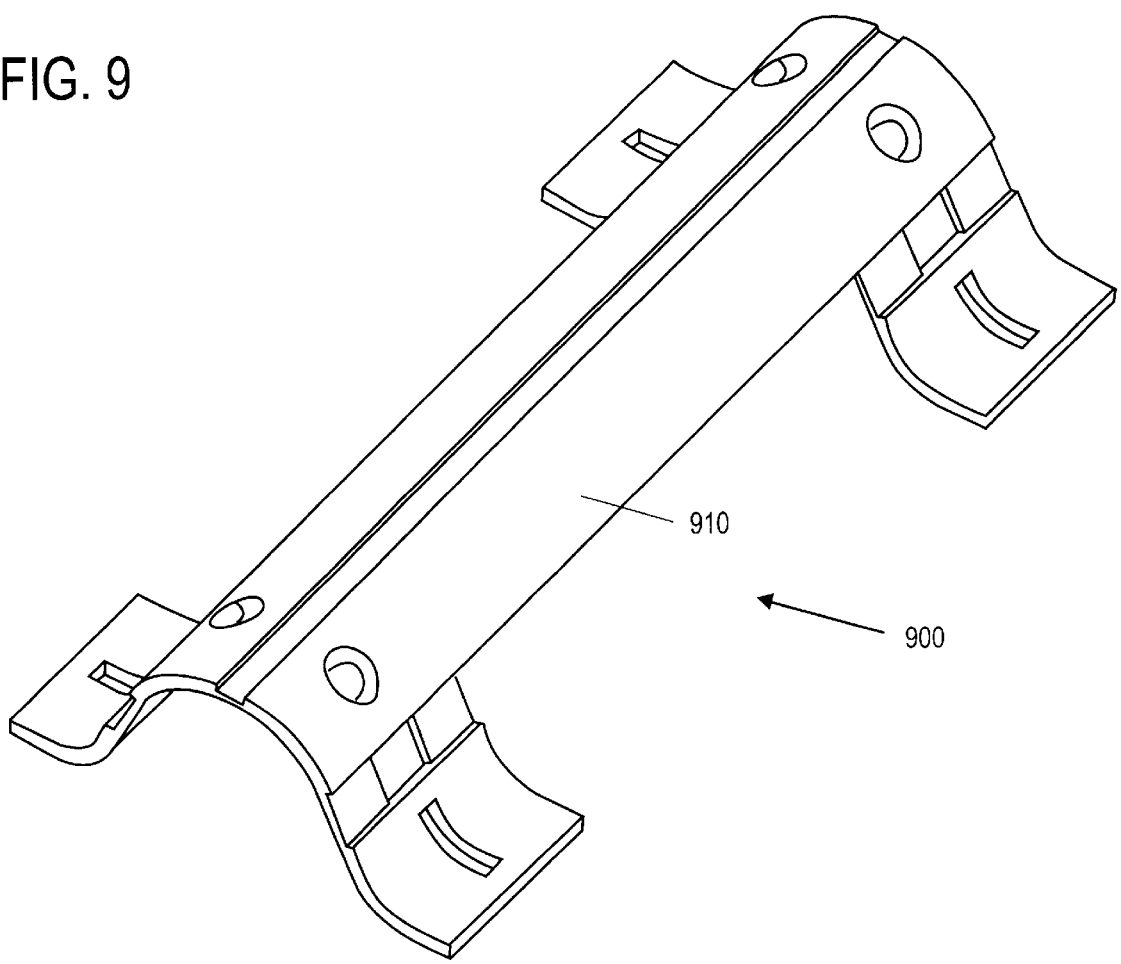
FIG. 9 illustrates an alternative embodiment of a flexure.

FIG. 9 illustrates an alternative embodiment of a flexure 900. In this embodiment, the flexure 900 is similar to the flexure 800 shown in FIG. 8. However, the shape of the body 910 is different from the body 810 shown in FIG. 8. In this embodiment, the body 910 has a flat surface near the top of the flexure 900 rather than a rounded shape. The body 910 may be described as having a trapezoidal shape. This facilitates the forming process of the flexure. In addition, the flat top surface facilitates the mounting of further components.

Figure 10:
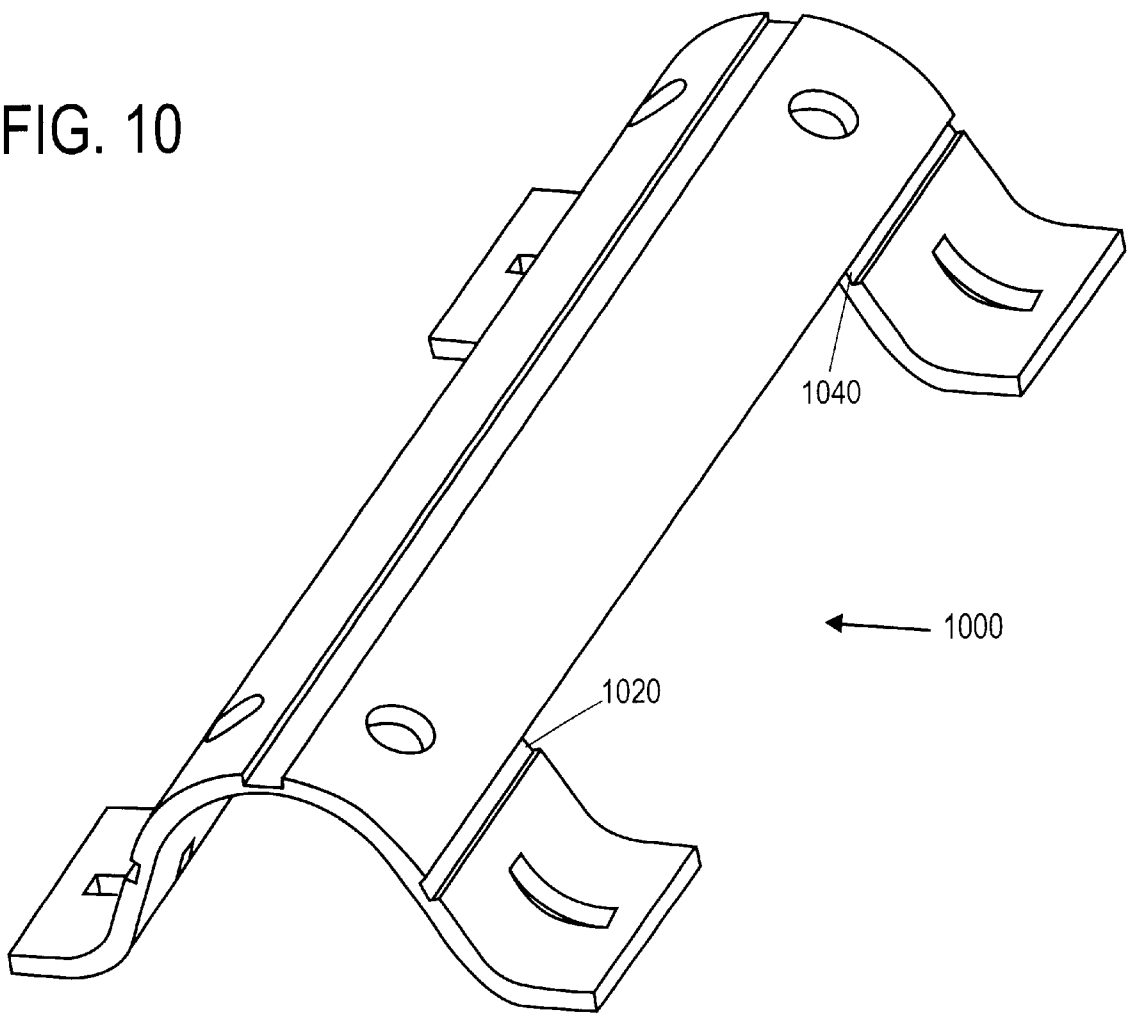
FIG. 10 illustrates an alternative embodiment of a flexure.

FIG. 10 illustrates an alternative embodiment of a flexure 1000. In this embodiment, the flexure 1000 includes thinned regions 1020 and 1040 that are thinned. This is done, in one embodiment, by etching a 0.5 strip on each leg. In one embodiment, the strip may be a *0.5* inch strip. The longer and narrower strips give the rear shoulders of the flexures reduced stiffness.

Figure 11:
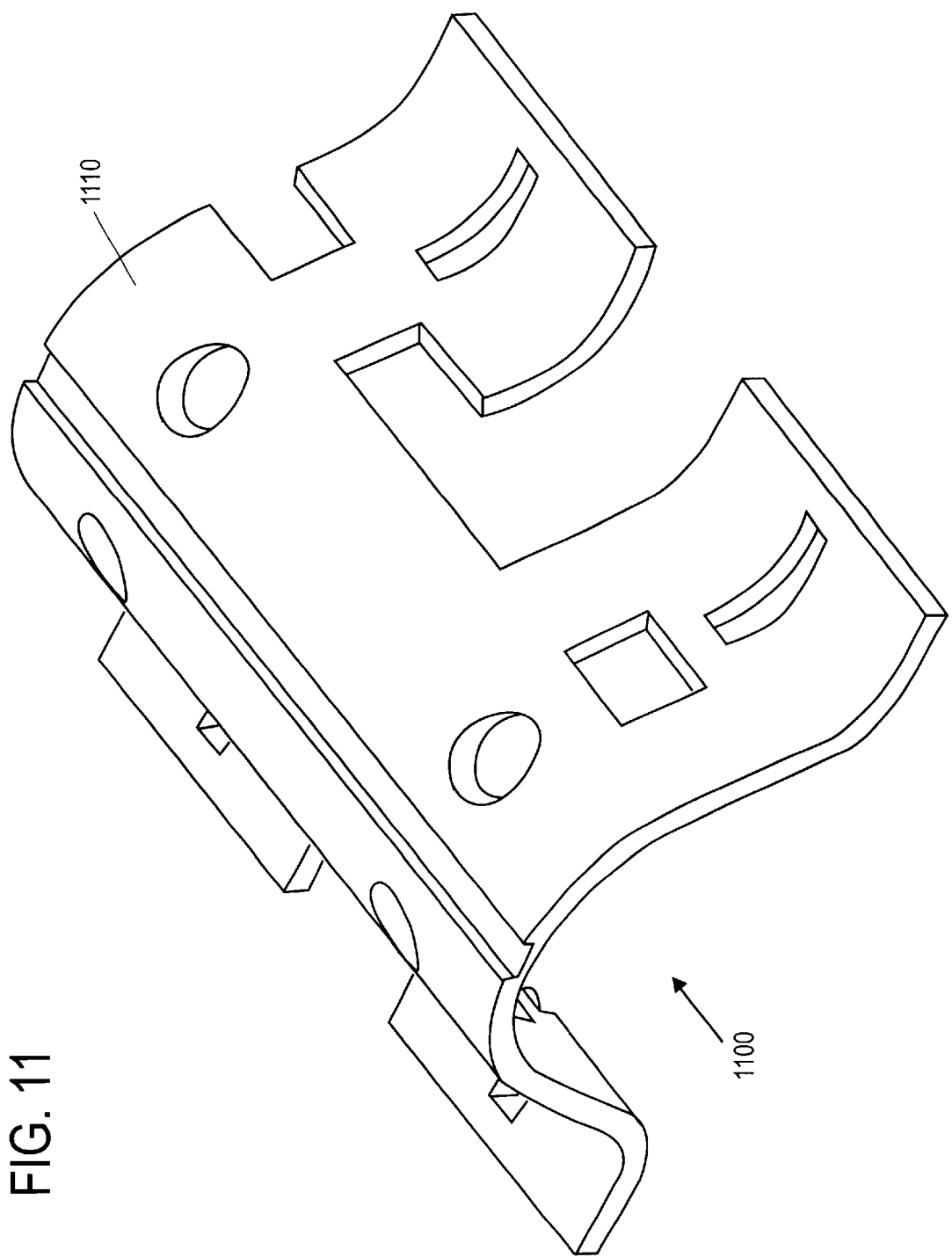
FIG. 11 illustrates an alternative embodiment of a flexure.

FIG. 11 illustrates a flexure 1100 similar to the flexure 200 shown in FIG. 2. However, the flexure 1100 in this embodiment has a shorter body 1110 than the flexure 200 in FIG. 2. The shorter body allows for a smaller packaging size.

Figure 12:
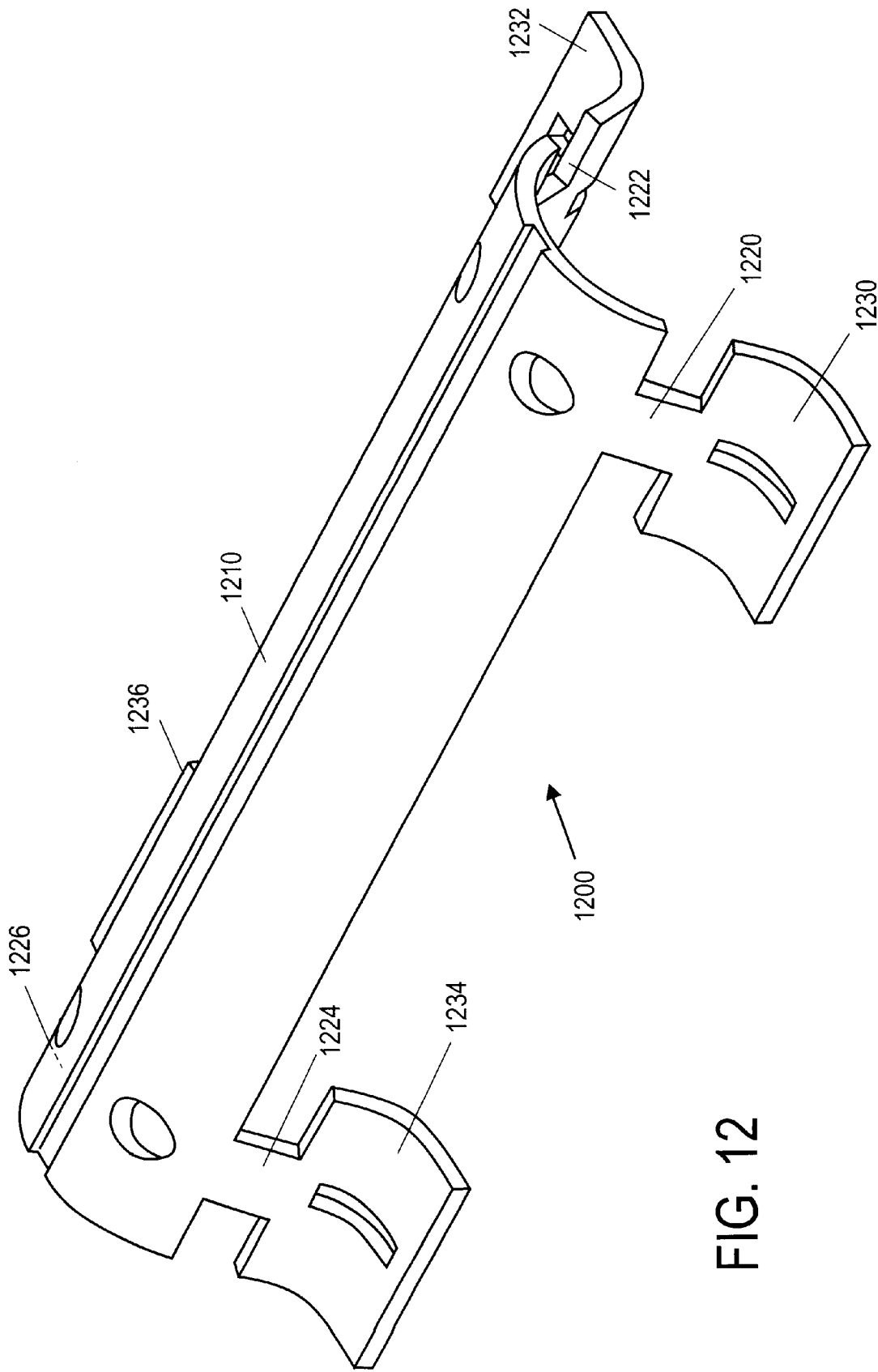
FIG. 12 illustrates an alternative embodiment of a flexure.

FIG. 12 illustrates an alternative embodiment of the flexure 200 shown in FIG. 2. In this embodiment, the front thinned regions 1220 and 1222 and the back thinned regions 1224 and 1226 are smaller in total area and include one post connecting each of the back legs 1234 and 1236 to the body 1210. This provides additional freedom of movement to body 1210 after the front legs 1230 and 1232 have been connected (e.g., welded). This additional freedom of movement may be used to align an optical fiber (or other component) coupled to the flexure 1200 after welding the front set of legs 1230 and 1232, yet before welding the back set of legs 1234 and 1236, such as is described above.

Figure 13:
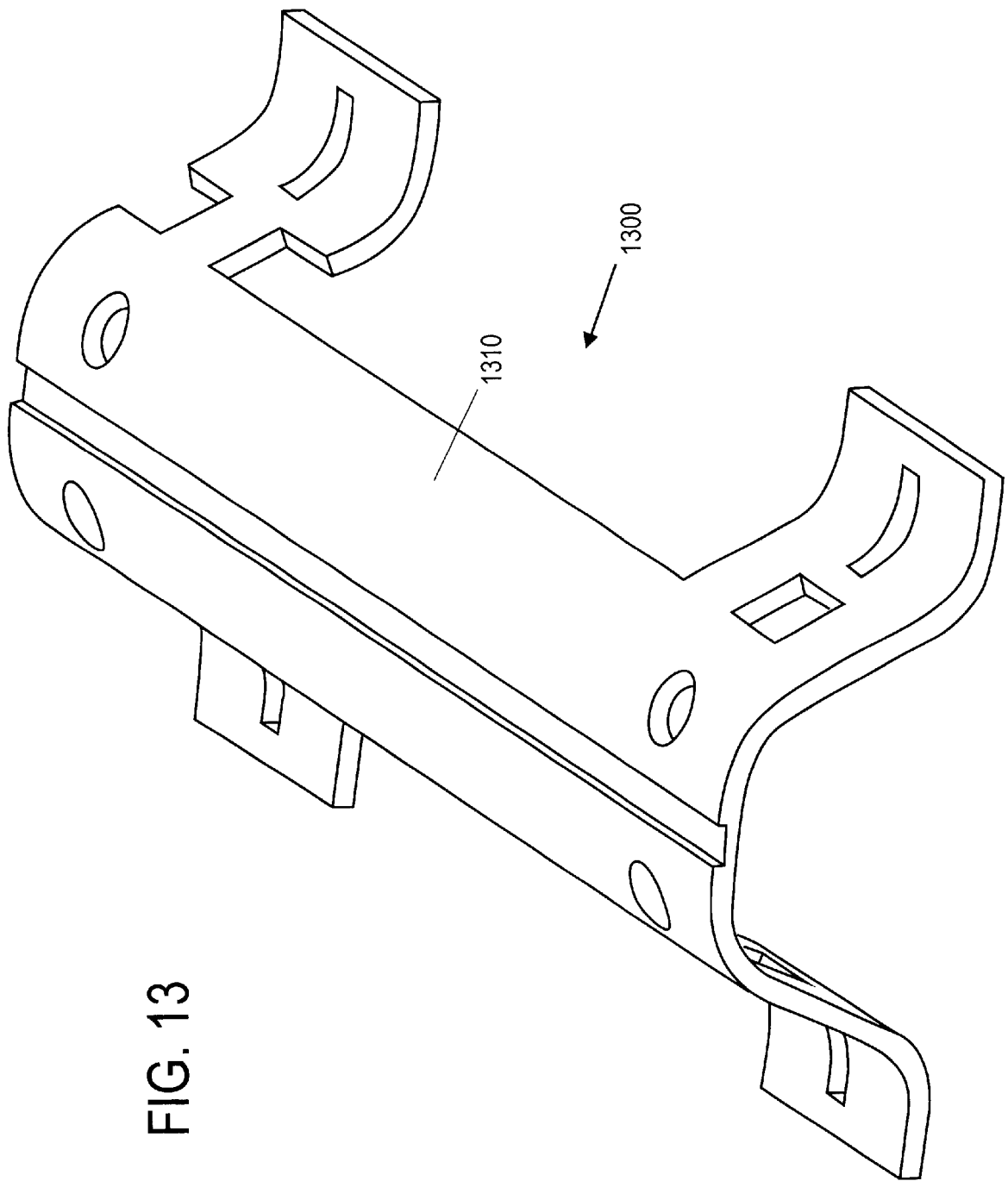
FIG. 13 illustrates an alternative embodiment of a flexure.

FIG. 13 illustrates an alternative embodiment of the flexure 200 shown in FIG. 2. In this embodiment, the flexure 1300 is similar to the flexure 200 shown in FIG. 2. However, the body 1310 has a flatter top portion rather than the round top portion shown on the body 210 in FIG. 2. In addition, the flexure 1300 in this embodiment has a greater overall height than the flexure 200 shown in FIG. 2.

Figure 14:
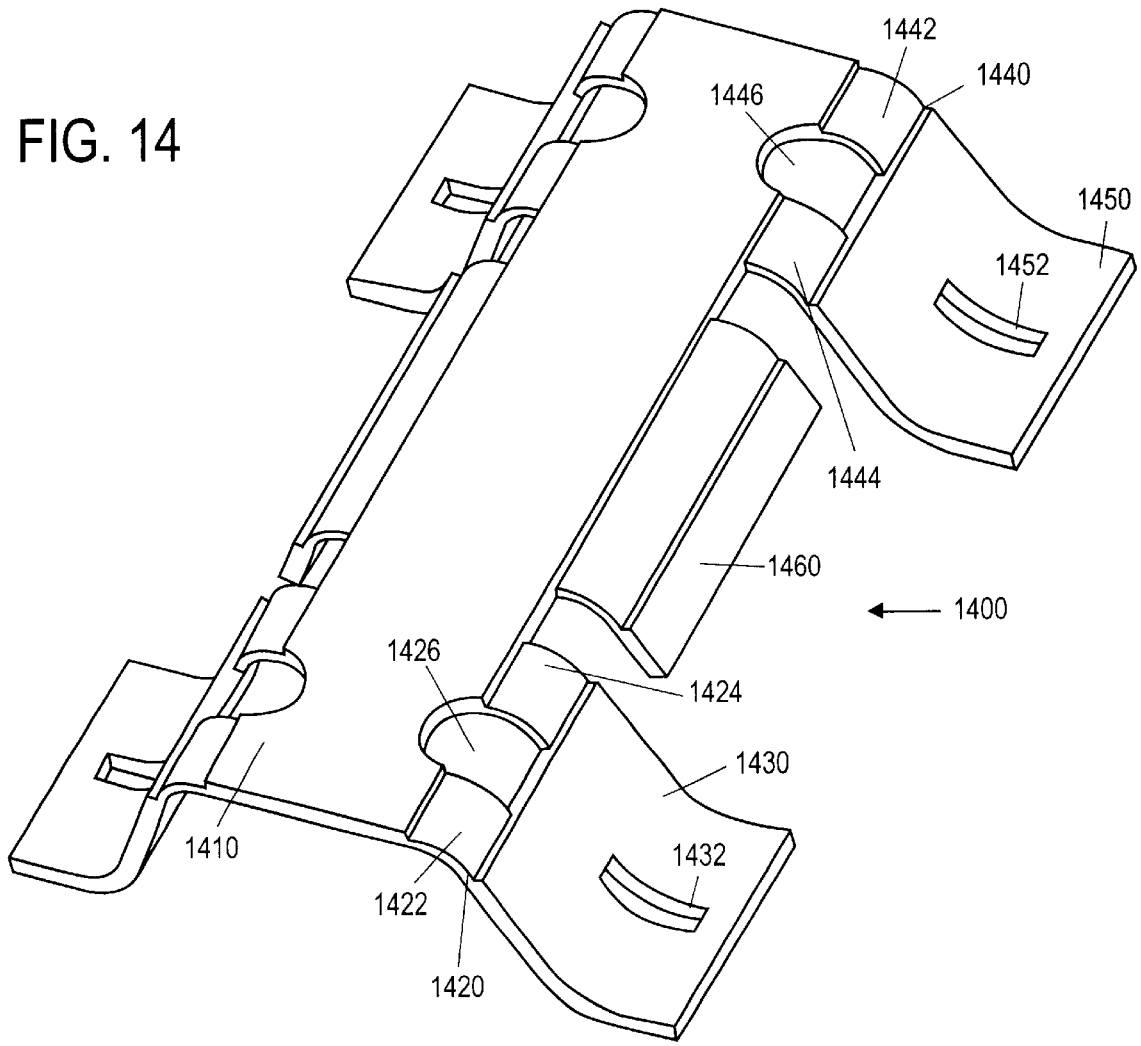
FIG. 14 illustrates an alternative embodiment of a flexure.
Figure 15:
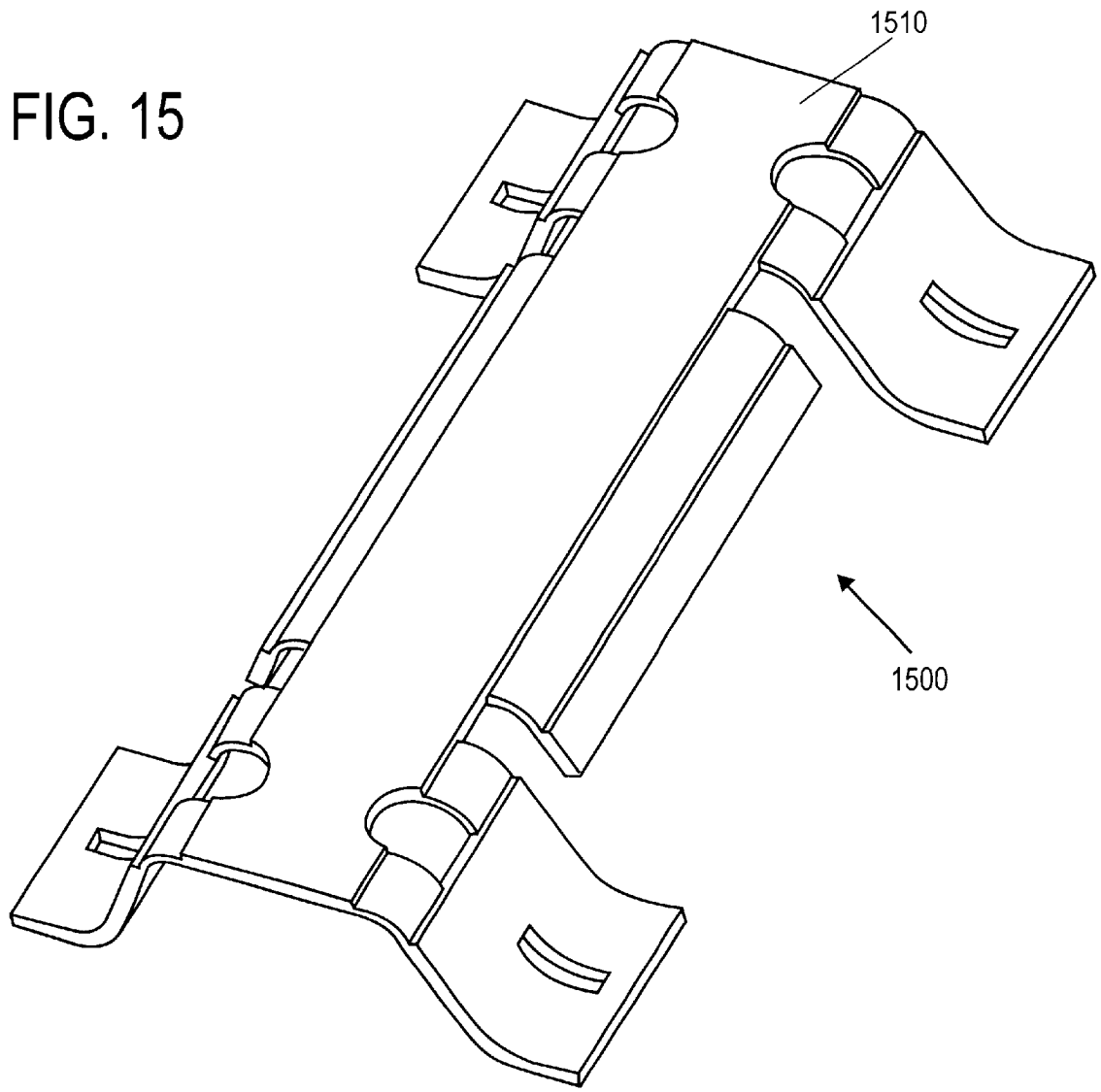
FIG. 15 illustrates an alternative embodiment of a flexure.

FIG. 14 illustrates an alternative embodiment of a flexure 1400. In this embodiment, the flexure 1400 includes a body 1410, a front pair of legs 1430, and a back pair of legs 1450. The body 1410 has a flatter top portion. The flexure 1400 has front thinned regions 1420. In this embodiment, sections 1422 and 1424 are thinned in the front thinned regions 1420. Also, sections 1426 are cut out on both sides of the flexure 1400. In this embodiment, the sections 1426 that are cut out have a different shape than other embodiments described above. The flexure 1400 also has back thinned regions 1440. In this embodiment, sections 1442 and 1444 are thinned in the back thinned regions 1440. Also, sections 1446 are cut out of the back thinned regions 1440 on both sides of the flexure 1400. The shape of cut out sections 1446 have the same shape as cut out sections 1426. The particular shape of cut out sections 1426 and 1446 in this embodiment facilitate the handling of the flexure 1400 by allowing a grabber to pick up the flexure 1400 more easily. In FIG. 14, the flexure 1400 has apertures in the form of front slots 1432 and back slots 1452 on the front and back legs 1430 and 1440, respectively to attach the flexure 1400 to the substrate. In this embodiment, the flexure 1400 includes stabilizers 1460 that increase stiffness to stabilize the flexure 1400. FIG. 15 illustrates an alternative embodiment of a flexure 1500 where the flexure 1500 is similar to the flexure 1400 in FIG. 4. However, the flexure 1500 has a longer body 1510.

Figure 16:
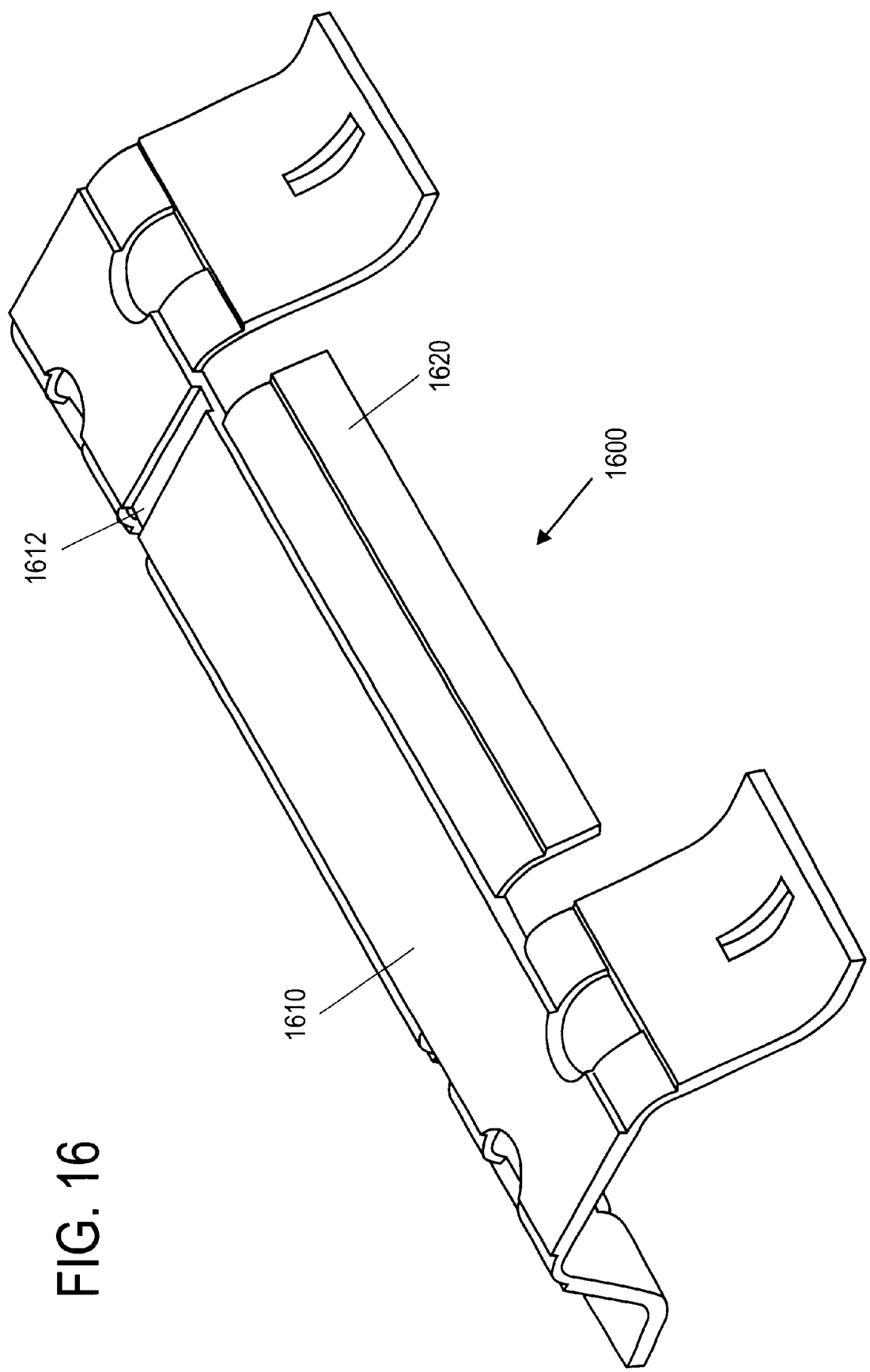
FIG. 16 illustrates an alternative embodiment of a flexure.

FIG. 16 illustrates an alternative embodiment of a flexure 1600. The flexure 1600 is similar to the flexure 1400 in FIG. 14. However, the body 1610 of the flexure 1600 has a region 1612 thinned in the top portion of the body 1610 to increase the overall flexibility of the flexure 1600. In this embodiment, the flexure 1600 also has a pair of stabilizers 1620 attached to the body 1610 of the flexure.

Figure 17:
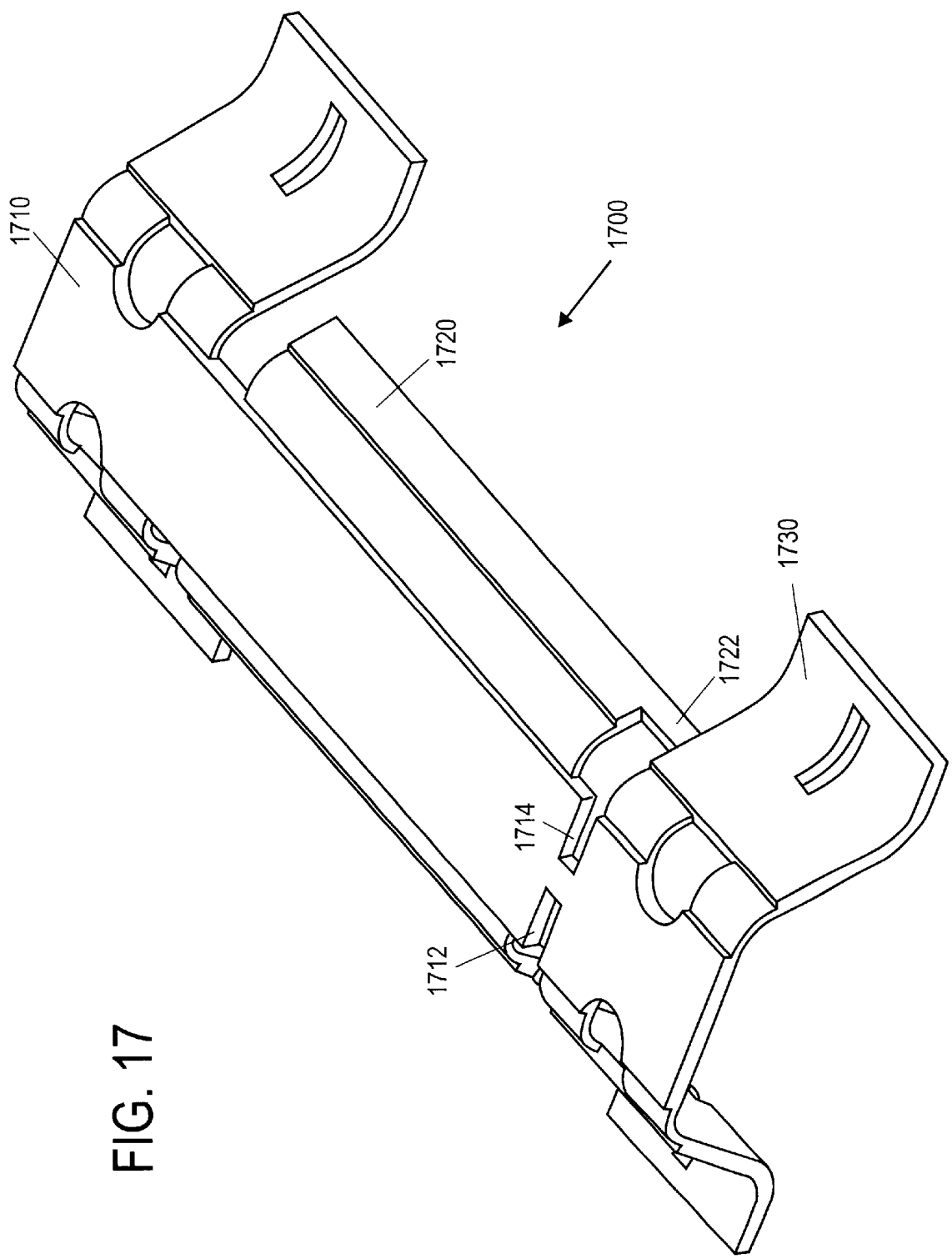
FIG. 17 illustrates an alternative embodiment of a flexure.

FIG. 17 illustrates an alternative embodiment of a flexure 1700. In this embodiment, the flexure 1700 has sections 1712 and 1714 cut from the body 1710 of the flexure 1700 before the flexure 1700 is coupled to the substrate. In many respects, the flexure 1700 is similar to the flexure 1400 shown in FIG. 14. However, the flexure 1700 has a pair of stabilizers 1720 that have bottom portions 1722 that connect the stabilizers 1720 to the front pair of legs 1730. In an alternative embodiment, bottom portions 1722 may be cut out after the pair of front legs 1730 are attached to the substrate and before the pair of back legs are attached to the substrate. This allows one to increase flexibility of the flexure after welding the front legs 1730.

Figure 18:
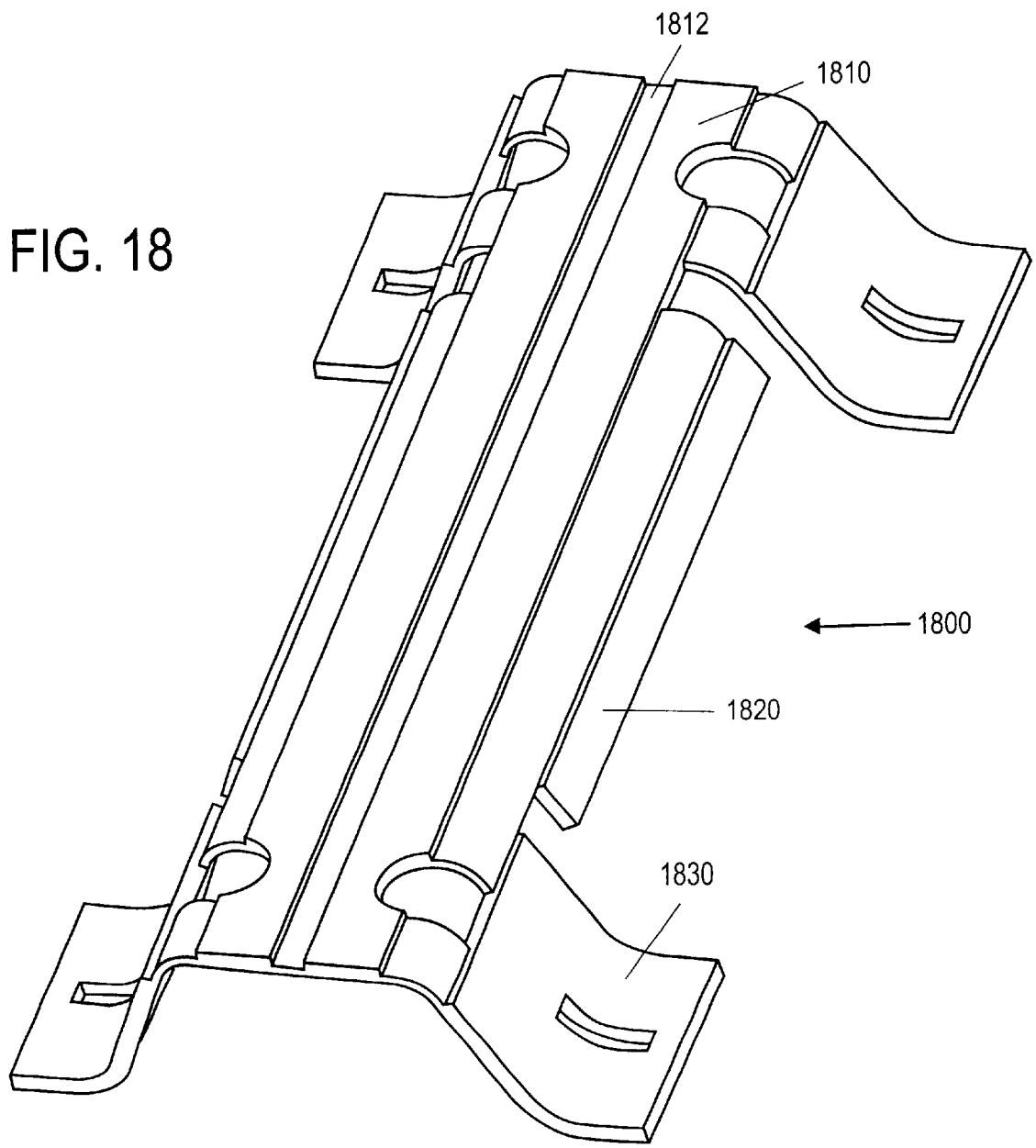
FIG. 18 illustrates an alternative embodiment of a flexure.

FIG. 18 illustrates an alternative embodiment of a flexure 1800. In this embodiment, the flexure 1800 includes stabilizers 1820 attached to the body 1810 of the flexure 1800. The stabilizers 1820 are also attached to the front pair of legs 1830. The flexure 1800 in this embodiment includes a groove 1812 that is capable of holding an optical component such as a fiber.

Figure 19:
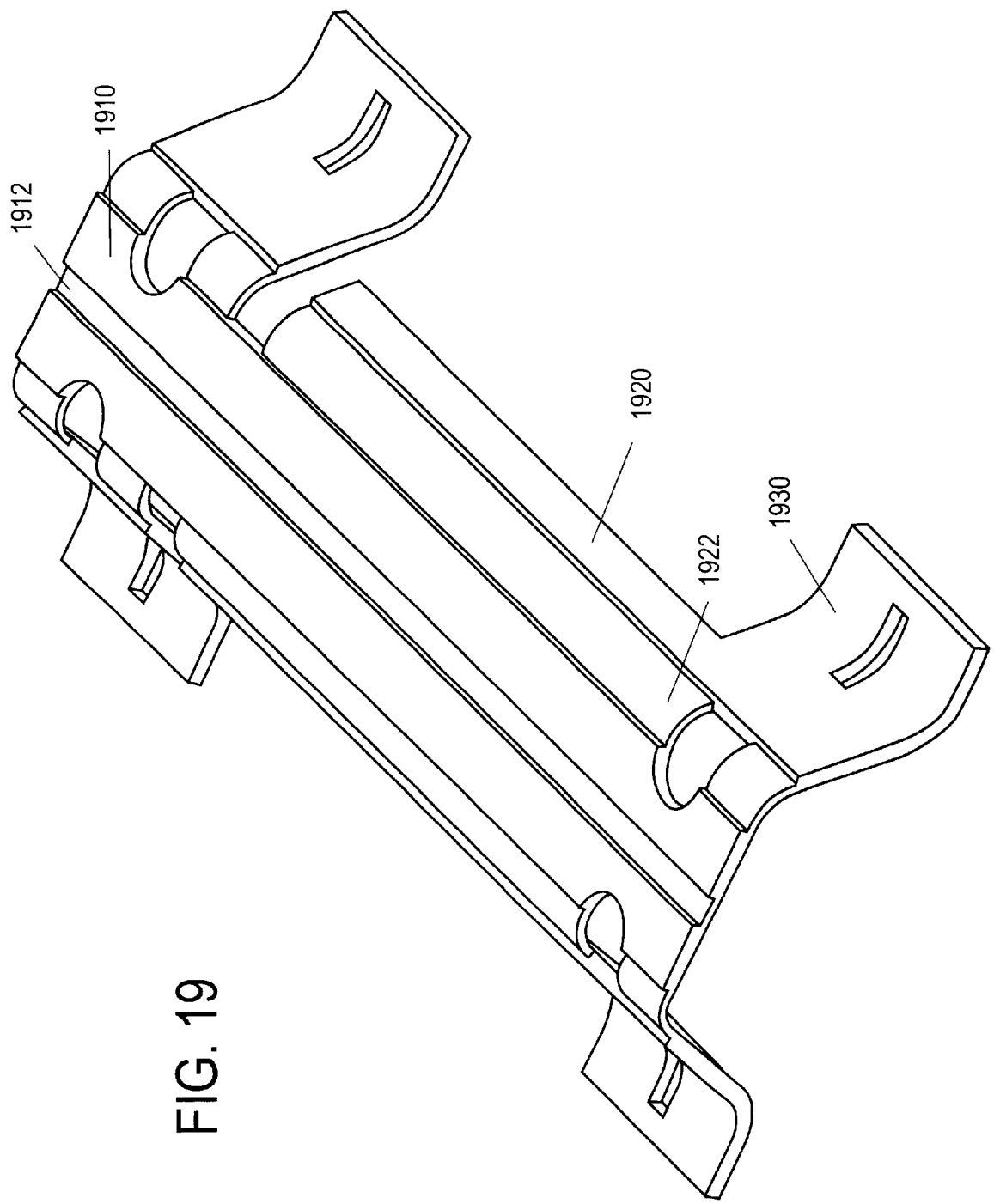
FIG. 19 illustrates an alternative embodiment of a flexure.

FIG. 19 illustrates an alternative embodiment of a flexure 1900. In this embodiment, the flexure 1900 includes stabilizers 1920 attached to the body 1910 of the flexure 1900. The stabilizers 1920 include a top portion 1922 that connects the stabilizers 1920 to the front pair of legs 1930. This makes the front end stiffer than what is shown in FIG. 18. This embodiment also includes a groove 1912 on the body 1910 of the flexure 1900 that is capable of holding an optical component such as a fiber.

Figure 20:
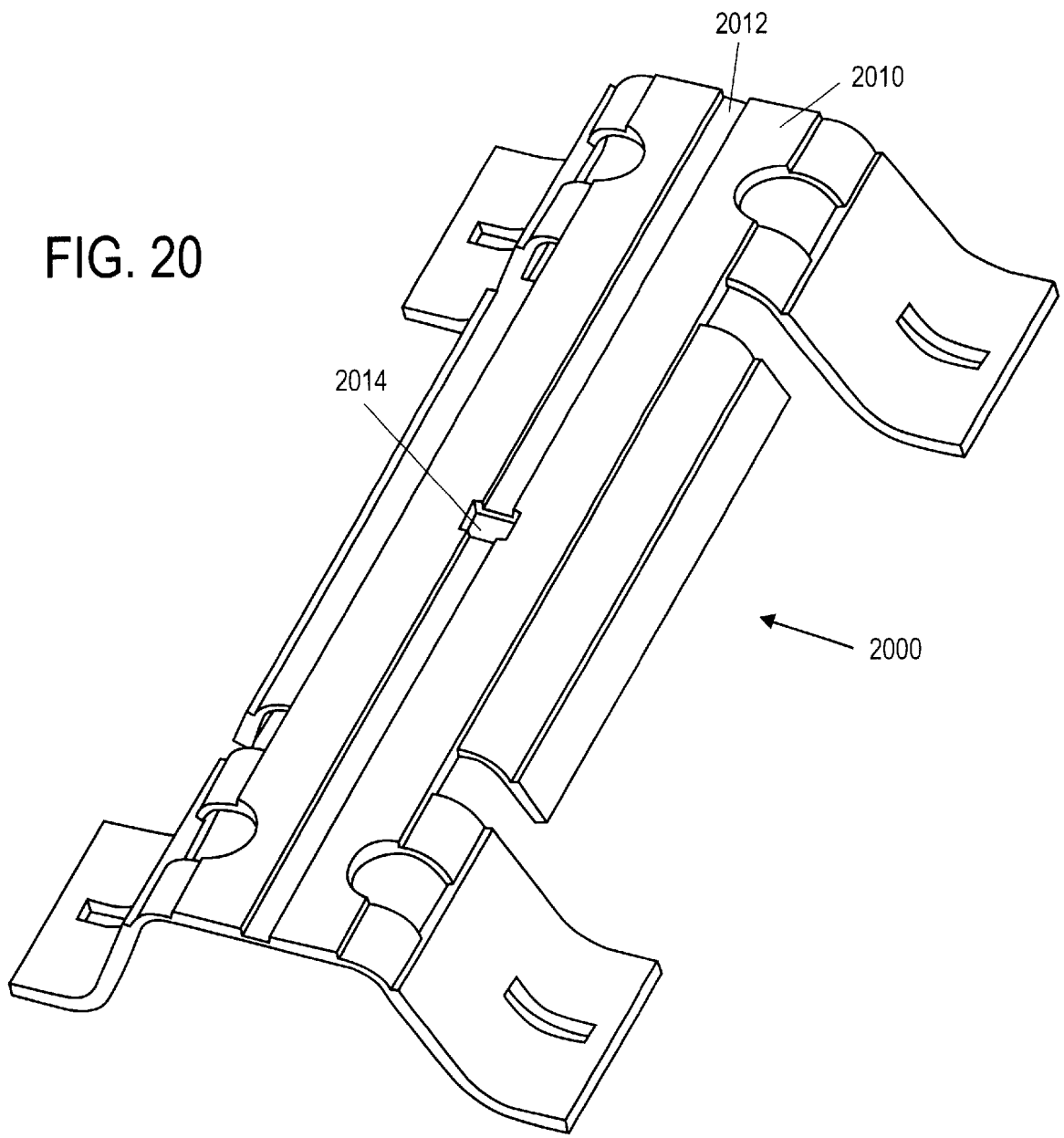
FIG. 20 illustrates an alternative embodiment of a flexure.

FIG. 20 illustrates an alternative embodiment of a flexure 2000. The flexure 2000 in this embodiment is similar to the embodiment of the flexure 1500 in FIG. 15. However, in this embodiment the flexure 2000 includes a groove 2012 in the body 2010 of the flexure 2000 that is capable of holding an optical element such as a fiber. In addition, the groove 2012 includes an aperture in the form of a window 2014 cut out from the body 2010. This window 2014 cuts off the flow of connection material.

Figure 21:
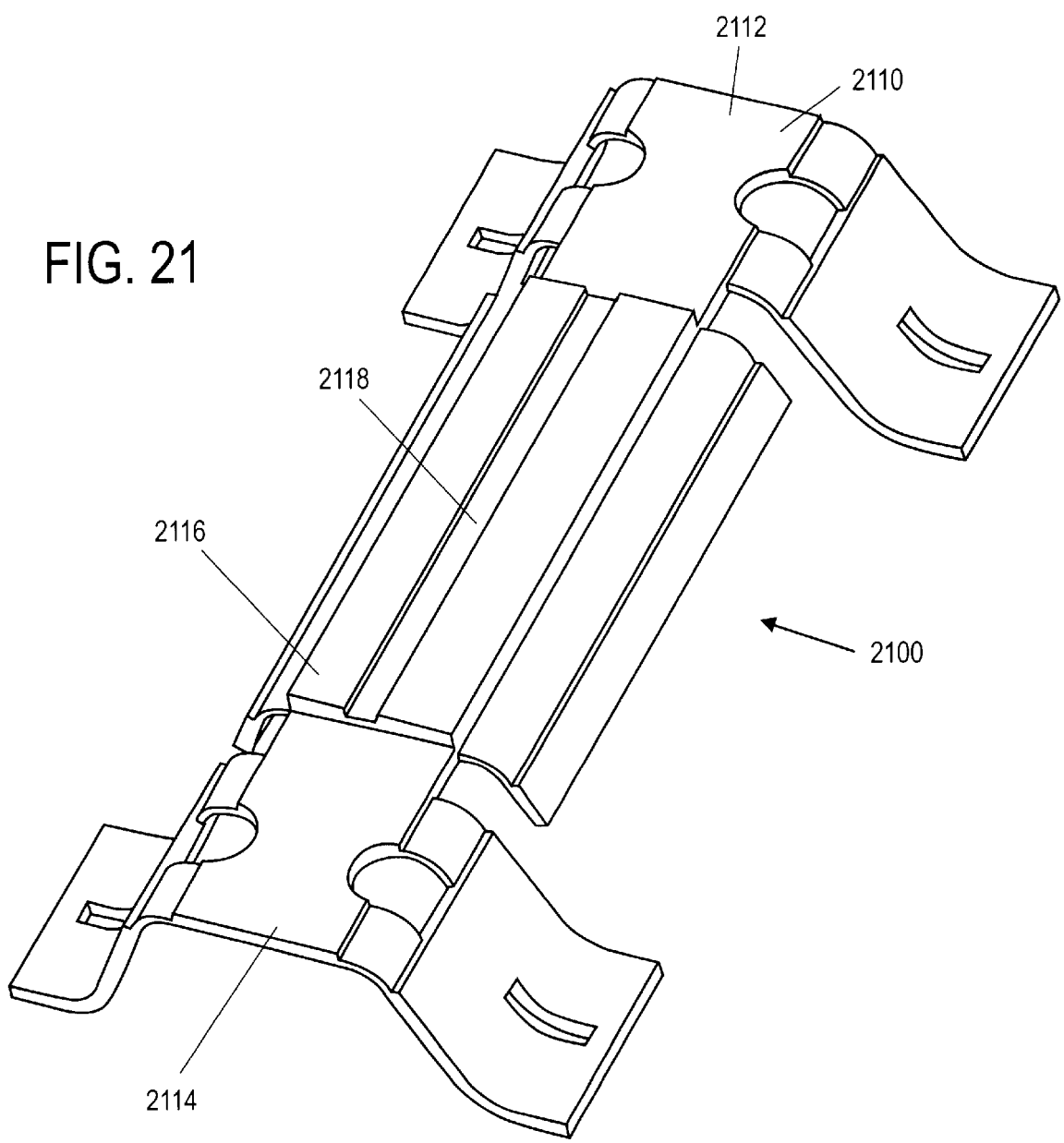
FIG. 21 illustrates an alternative embodiment of a flexure.

FIG. 21 illustrates an alternative embodiment of a flexure 2100. FIG. 21 shows a two piece assembly where one piece is the flexure 2100 and another piece is a optical component holder. The flexure 2100 in this embodiment is similar to the embodiment of the flexure 600 in FIG. 6. However, flexure 2100 is stiffer and does not include a groove as the flexure 600 in FIG. 6. in this embodiment, the flexure 2100 includes two portions 2112 and 2114 that are thinned in the body 2110 of the flexure 2100. Portion 2116 is elevated between portions 2112 and 2114 on the body 2110 and includes a groove 2118 that is capable of holding an optical element such as a fiber.

Figure 22:
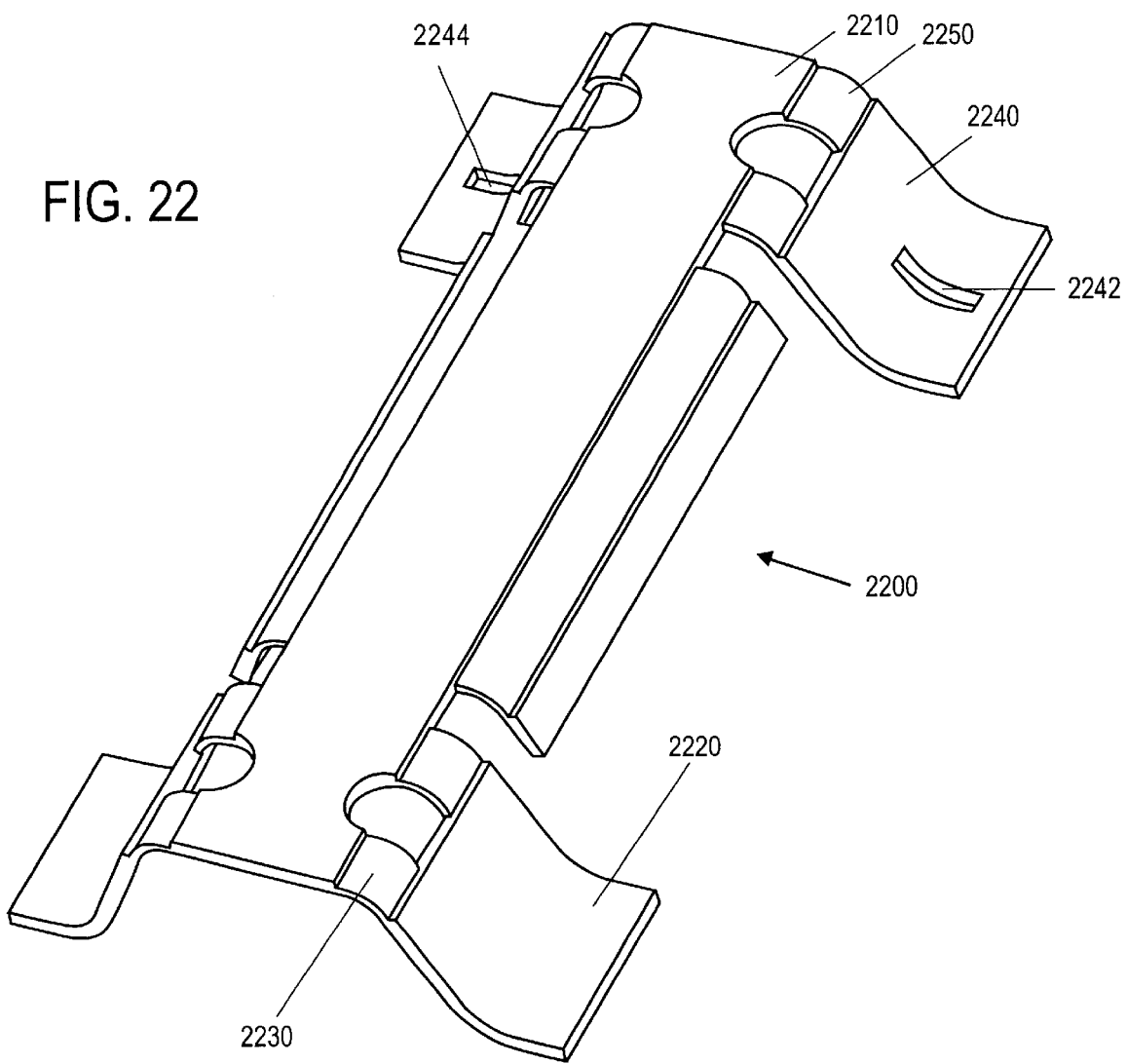
FIG. 22 illustrates an alternative embodiment of a flexure.

FIG. 22 illustrates an alternative embodiment of a flexure 2200. This embodiment is similar to the embodiment of the flexure 1500 shown in FIG. 15. In this embodiment, the flexure 2200 includes a body 2210, a front pair of legs 2220, and a back pair of legs 2240. The flexure 2200 has front thinned regions 2230 and back thinned regions 2250. In this embodiment, only the back pair of legs 2240 include slots 2242 and 2244. The front pair of legs 2220 do not have slots.

Figure 23:
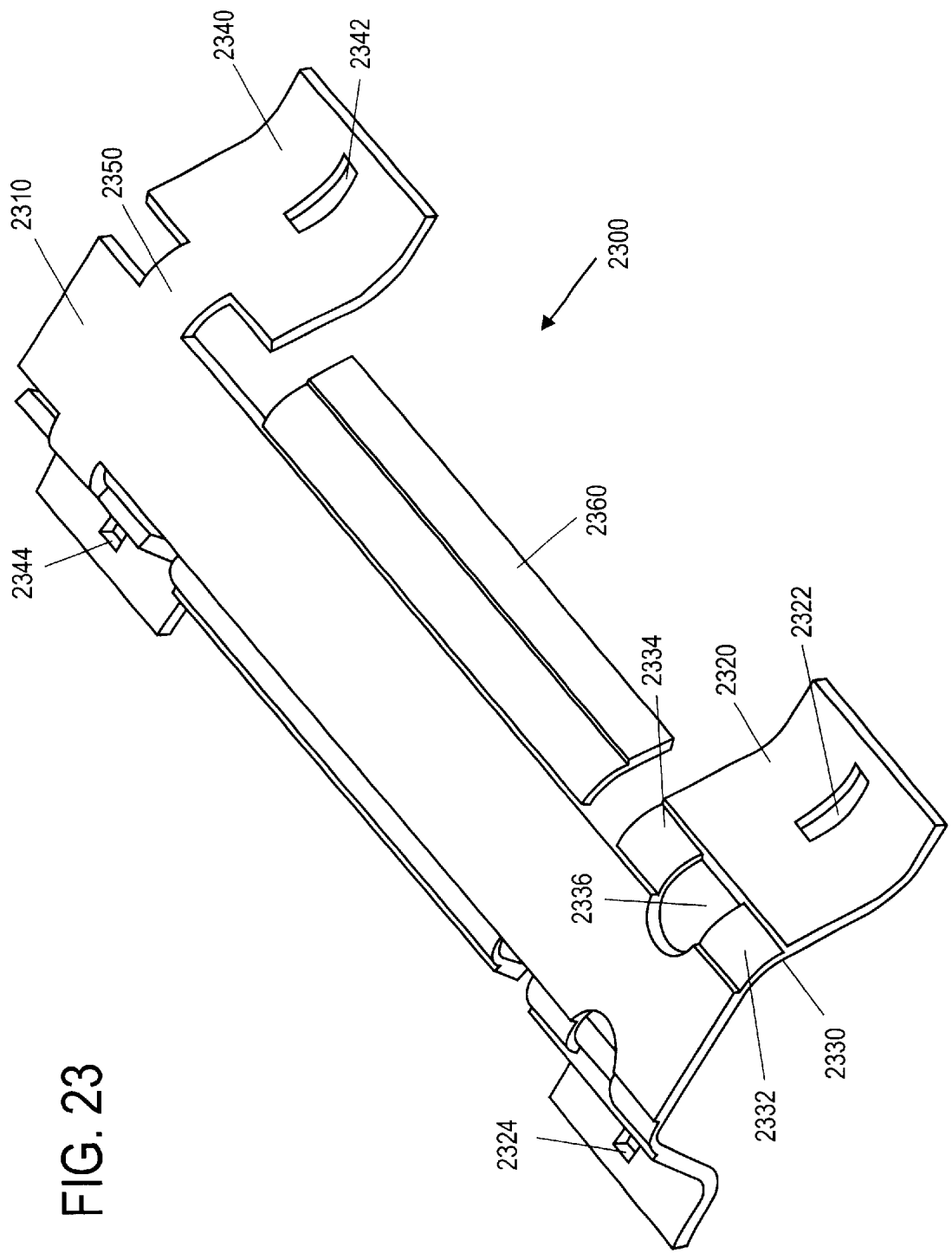
FIG. 23 illustrates an alternative embodiment of a flexure.

FIG. 23 illustrates an alternative embodiment of a flexure 2300. This embodiment is similar to the embodiment of the flexure 1500 shown in FIG. 15. In this embodiment, the flexure 2300 includes a body 2310, a front pair of legs 2320, and a back pair of legs 2340. The flexure 2300 includes front thinned regions 2330 and back thinned regions 2350. In this embodiment, sections 2332 and 2334 are thinned in the front thinned regions 2330. Sections 2336 are also cut from the front thinned regions 2330 with a shape similar to the cut out sections 1426 shown in FIG. 14. The back thinned regions 2340 are smaller in total area than the front thinned regions 2330. Both pairs of legs 2320 and 2340 also include apertures in the form of slots 2322, 2324, 2342, and 2344 for attaching the flexure 2300 to a substrate. As seen in other embodiments, this embodiment includes a stabilizer 2360 attached to the body 2310 of the flexure 2300.

Figure 24:
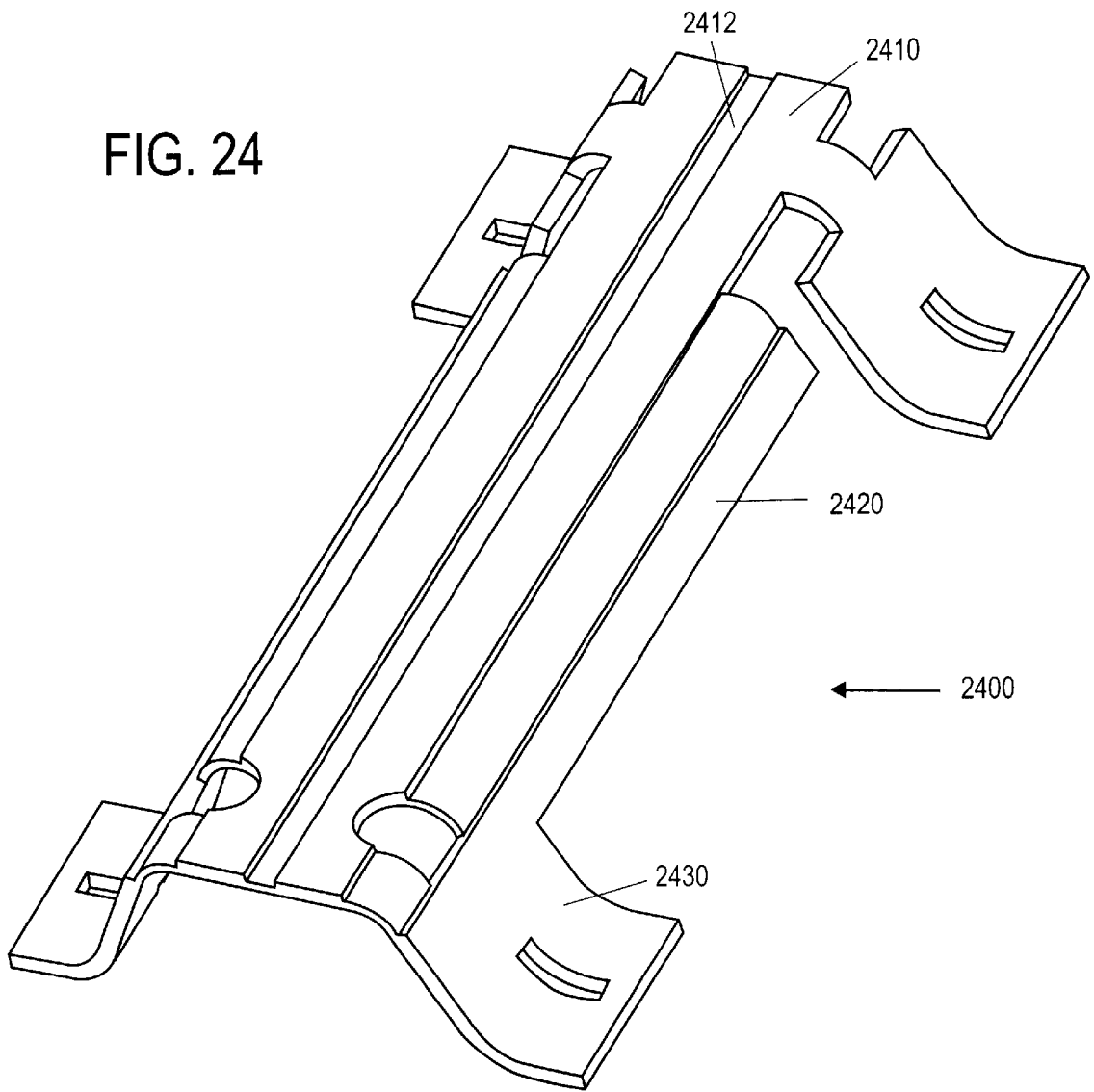
FIG. 24 illustrates an alternative embodiment of a flexure.

FIG. 24 illustrates an alternative embodiment of a flexure 2400. This flexure 2400 is similar to the flexure 2300 shown in FIG. 2300. However, the stabilizer 2420 is attached to both the front pair of legs 2430 and the body 2410. In addition, the flexure 2400 includes a groove 2412 in the body 2410 of the flexure 2400 that is capable of holding an optical component such as an optical fiber.

Figure 25:
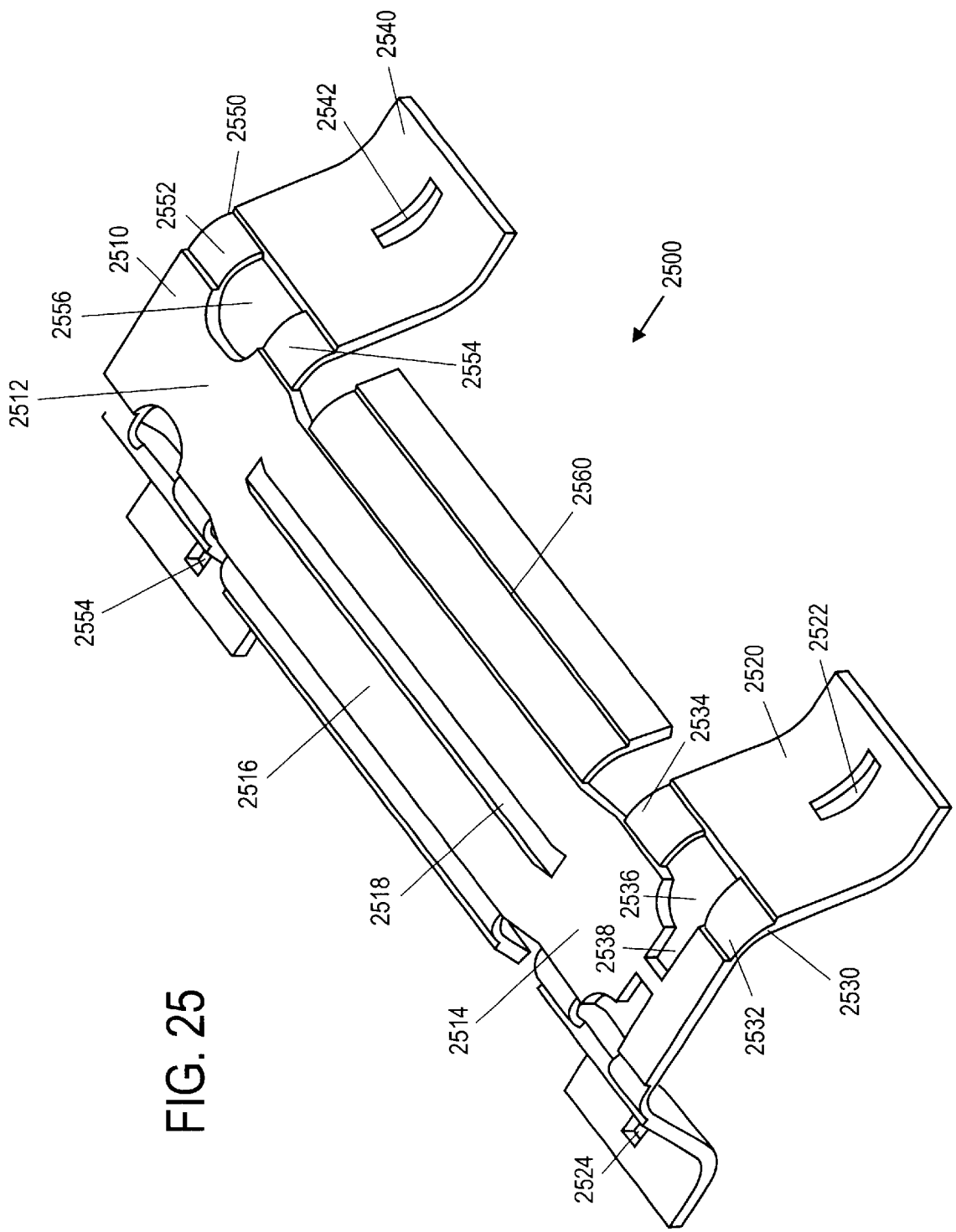
FIG. 25 illustrates an alternative embodiment of a flexure.

FIG. 25 illustrates an alternative embodiment of a flexure 2500. In this embodiment, the flexure 2500 includes a body 2510, a front pair of legs 2520, and a back pair of legs 2540. The body 2510 includes portions 2512 and 2514 with portion 2516 elevated between portions 2512 and 2514. Portion 2516 includes a groove 2518. The flexure 2500 includes front thinned regions 2530. Sections 2532 and 2534 are thinned in the front thinned regions 2530. Sections 2536 are cut out in the front thinned regions 2530 on both sides of the flexure 2500. Also, additional portions 2538 are cut out of the body 2510 of the flexure 2500 where the body 2510 is attached to the front thinned regions 2530. The flexure 2500 also includes back thinned regions 2550. Sections 2552 and 2554 are thinned in the back thinned regions 2550. Sections 2556 are cut out of the back thinned regions 2550 on both sides of the flexure 2500. These cut out sections 2556 have a different shape than the cut out sections 2536 of the front thinned regions 2530. In this embodiment, the flexure 2500 includes stabilizers 2560 attached to the body 2510. Also, the front and back legs 2520 and 2540 includes apertures in the form of slots 2522, 2524, 2542, and 2544 to attach the flexure 2500 to a substrate.

Figure 26:
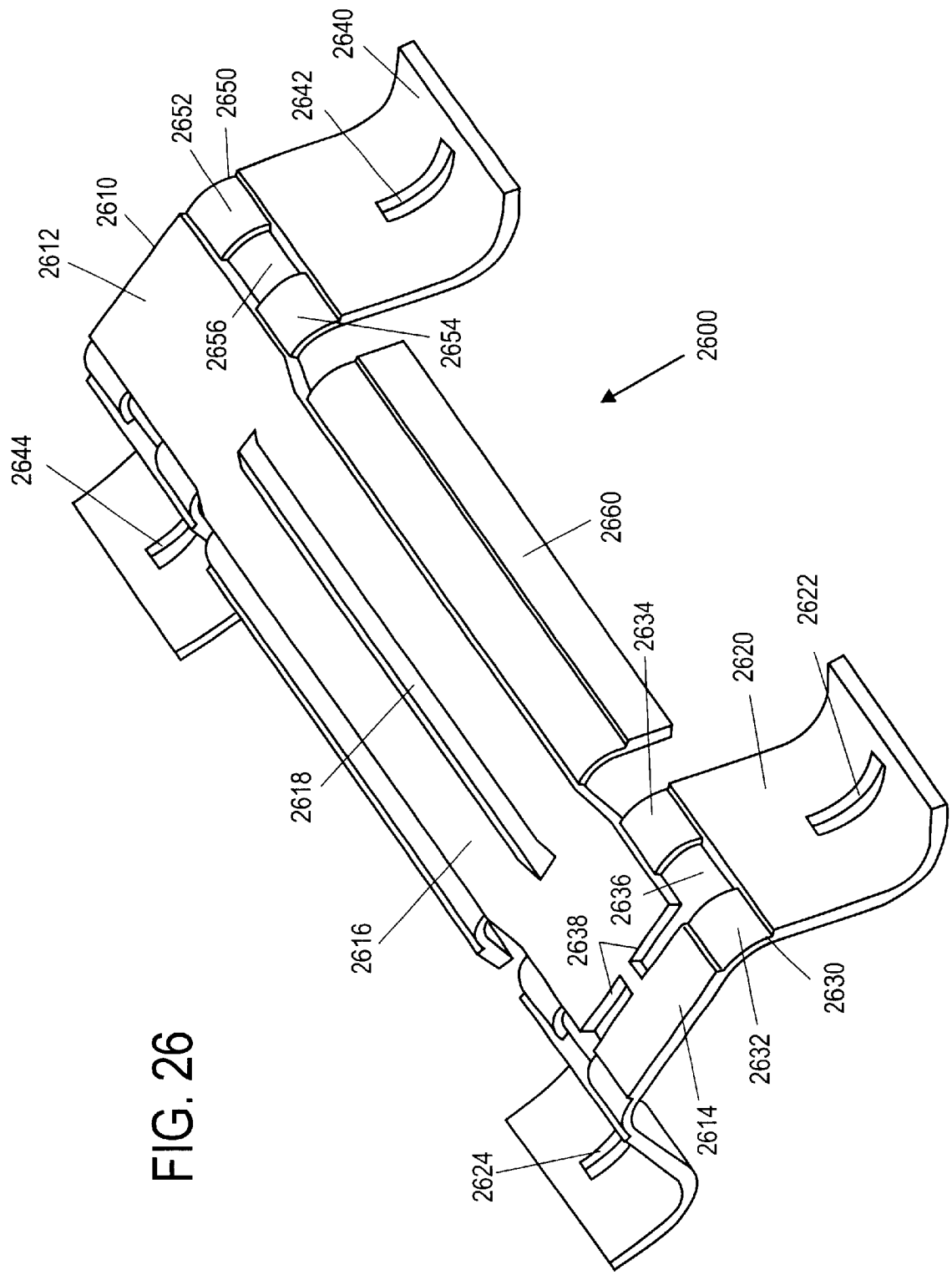
FIG. 26 illustrates an alternative embodiment of a flexure.

FIG. 26 illustrates an alternative embodiment of a flexure 2600. In this embodiment, the flexure 2600 includes a body 2610, a front pair of legs 2620, and a back pair of legs 2640. The body 2610 includes portions 2612 and 2614 with portion 2616 elevated between portions 2612 and 2614. Portion 2616 includes a groove 2618. The flexure 2600 has front thinned regions 2630. Sections 2632 and 2634 are thinned in the front thinned regions 2630. Sections 2636 are cut out in the front thinned regions 2630 on both sides of the flexure 2600. Also, additional portions 2638 are cut out of the body 2610 of the flexure 2600 where the body 2610 is attached to the front thinned regions 2630. The flexure 2600 also includes back thinned regions 2650. Sections 2652 and 2654 are thinned in the back thinned regions 2650. Sections 2556 are cut out of the back thinned regions 2650 on both sides of the flexure 2500. These cut out sections 2656 have a different shape than the cut out sections 2636 of the front thinned regions 2630. In this embodiment, the flexure 2600 includes stabilizers 2660 attached to the body 2610. Also, the front and back legs 2620 and 2640 includes apertures in the form of slots 2622, 2624, 2642, and 2644 to attach the flexure 2600 to a substrate.

Figure 27:
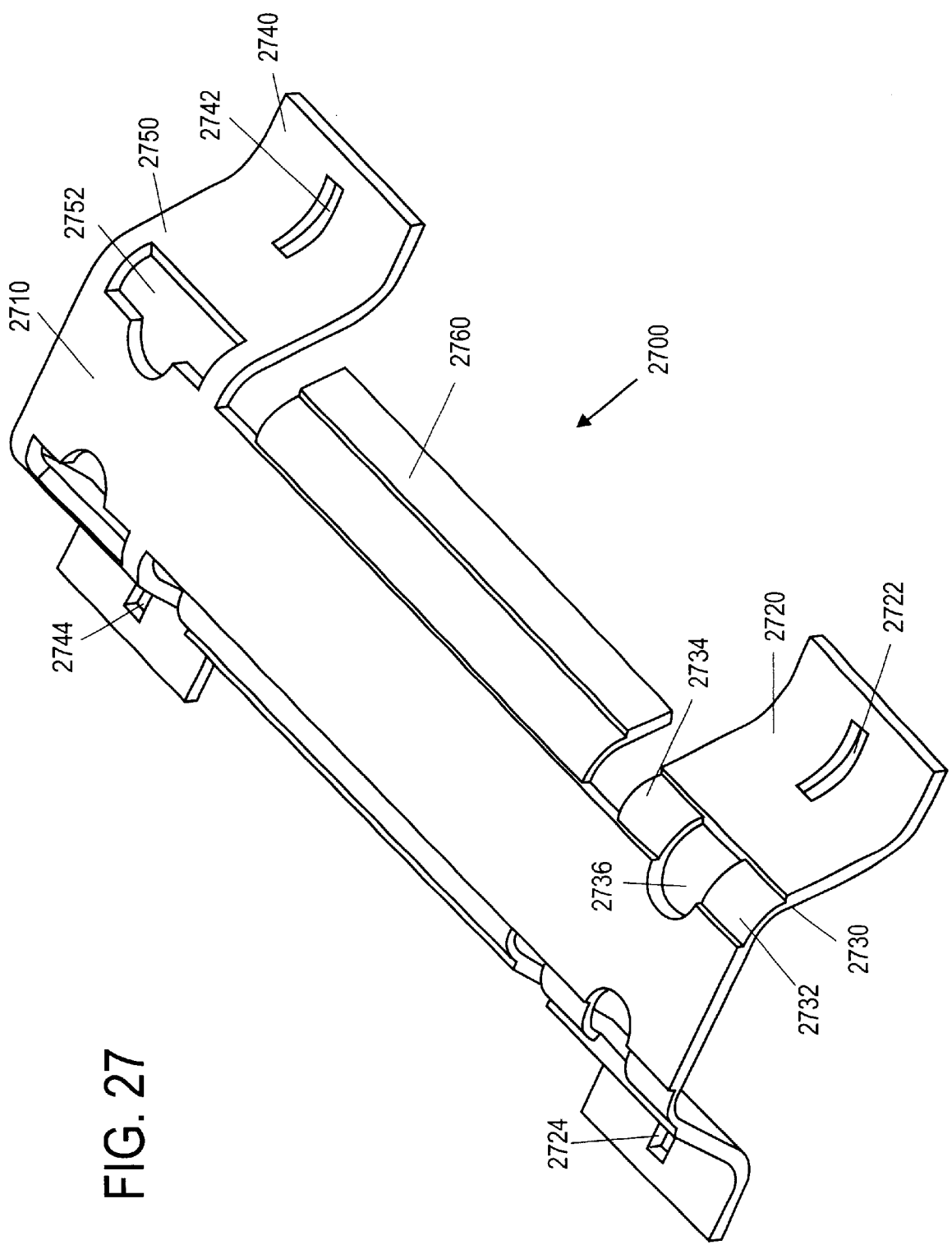
FIG. 27 illustrates an alternative embodiment of a flexure.
Figure 28:
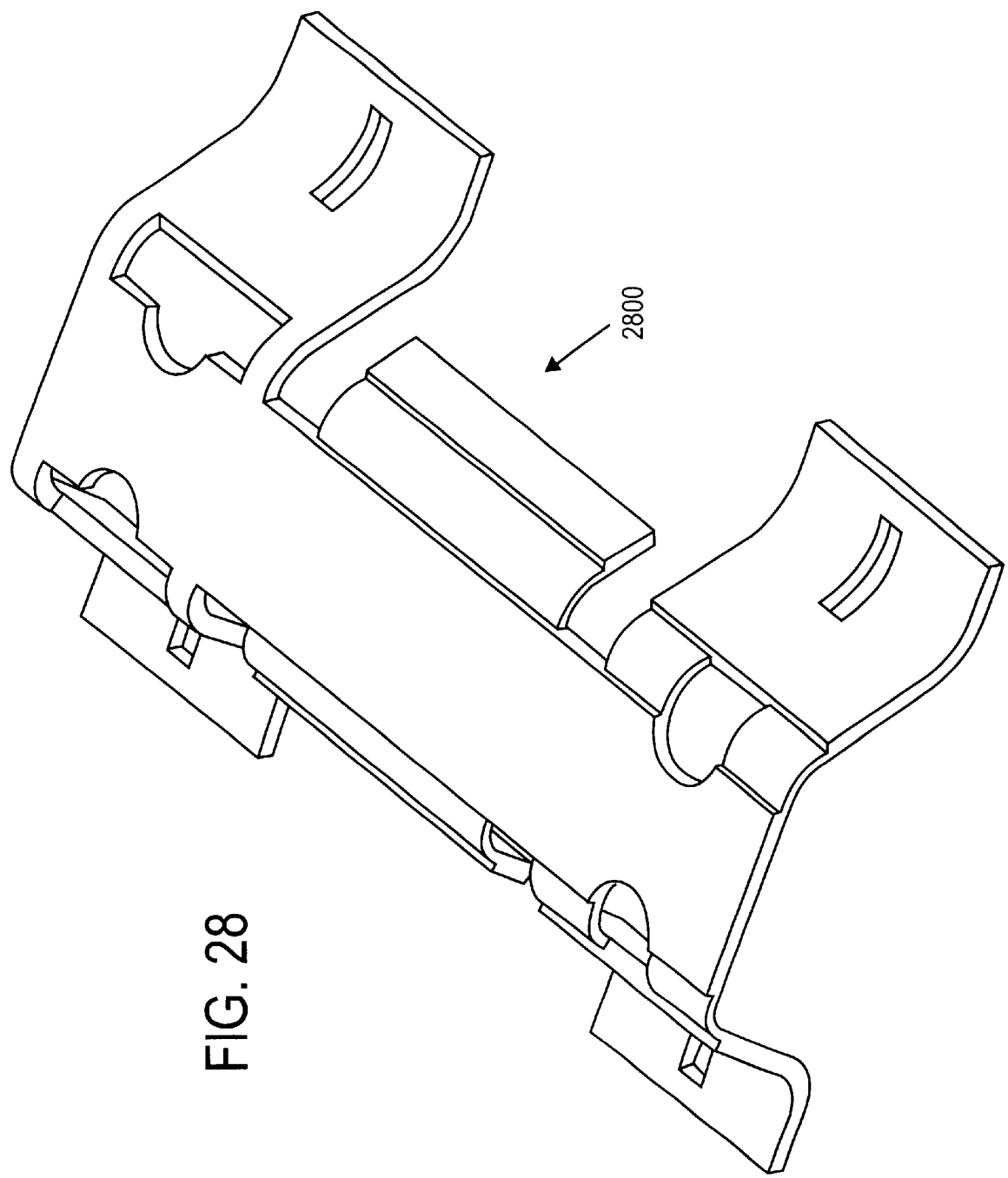
FIG. 28 illustrates an alternative embodiment of a flexure.

FIG. 27 illustrates an alternative embodiment of a flexure 2700. In this embodiment, the flexure 2700 includes a body 2710, a front pair of legs 2720, and a back pair of legs 2740. The flexure 2700 includes front thinned regions 2730. Sections 2732 and 2734 are thinned in the front thinned regions 2730. Sections 2736 are cut out of the front thinned regions 2730 on both sides of the flexure 2700. The flexure 2700 also includes back thinned regions 2750. In this embodiment, the back thinned regions 2750 have certain shaped apertures 2752 cut out of the back thinned regions 2750. The flexure 2700 includes stabilizers 2760 attached to the body 2710. Also, the front and back legs 2720 and 2740 include apertures in the form of slots 2722, 2724, 2742, and 2744 to attach the flexure 2700 to a substrate. FIG. 28 illustrates an alternative embodiment of the flexure 2700 shown in FIG. 27. The flexure 2800 in FIG. 28 is similar to the flexure 2700 shown in FIG. 27. However, the flexure 2800 in FIG. 28 is shorter in length than the flexure 2700 shown in FIG. 27.

FIG. 29 illustrates an alternative embodiment of a flexure 2900. The flexure 2900 in this figure is similar to the flexure 2800 shown in FIG. 28. However, in this embodiment, the front thinned regions 2930 are identical to the back thinned regions 2950. The back thinned regions 2950 have certain shaped apertures 2952 cut out of the back thinned regions 2950. The front thinned regions 2930 also have certain shaped apertures 2932 cut out of the front thinned regions 2930. In this embodiment, the flexure 2900 includes stabilizers 2960 attached to the body 2910. Also, the front and back legs 2920 and 2940 includes apertures in the form of slots 2922, 2924, 2942, and 2944 to attach the flexure 2900 to a substrate.

An apparatus for a flexure has been described. Although the present invention is described herein with reference to specific embodiments, many modifications and variations therein will readily occur to those with ordinary skill in the art. Accordingly, all such variations and modifications are included within the intended scope of the present invention as defined by the following claims.

What is claimed is:

1. A package comprising:
   a substrate having a floor;
   a first optical element coupled to the substrate;
   a second optical element; and
   a flexure coupled to the second optical element and the substrate to maintain the second optical element in optical alignment with the first optical element, the flexure including a body and a pair of front legs, the flexure also including a pair of rear legs that are attached to the substrate after the attachment of the front legs to the substrate, the attachment of the rear legs causing the flexure to move from a first flexure position to a second flexure position, the distance between the first flexure position and the second flexure position equaling an offset distance, the body of the flexure having a specified length chosen such that the offset distance causes a second offset distance of the second optical component held by the flexure which is within a specified range, the second offset distance equal to the distance between a primary second optical component position and a secondary second optical component position.

2. The package of claim 1 wherein the body has a circular segment shape.

3. The package of claim 2 wherein the body includes a pair of alignment apertures.

4. The package of claim 2 further comprising an optical component holder.

5. The package of claim 4 wherein the optical component holder is a fiber groove.

6. The package of claim 2 further comprising a platform mounted on top of the body of the flexure, the platform shorter in length than the body of the flexure.

7. The package of claim 2 further comprising a platform mounted on top of the body of the flexure, the platform running the length of the body.

8. The package of claim 2 wherein at least one leg includes an aperture in the form of a slot.

9. The package of claim 8 wherein the slot comprises a surface having an etched region, the etched region dividing the surface into a first surface and a second surface, and the second surface including an aperture.

10. The package of claim 8 wherein the slot comprises a surface having a first etched region and a second etched region, the first and second etched regions dividing the surface into a first surface, a second surface, and a third surface, and the third surface including an aperture.

11. The package of claim 1 wherein the body is a trapezoidal shape.

12. The package of claim 11 wherein the body includes a pair of alignment apertures.

13. The package of claim 11 further comprising a platform mounted on top of the body of the flexure, the platform shorter in length than the body of the flexure.

14. The package of claim 11 further comprising a platform mounted on top of the body of the flexure, the platform running the length of the body.

15. The package of claim 11 further comprising an optical component holder.

16. The package of claim 15 wherein the optical component holder is a fiber groove.

17. The package of claim 11 wherein at least one leg includes an aperture in the form of a slot.

18. The package of claim 17 wherein the slot comprises a surface having an etched region, the etched region dividing the surface into a first surface and a second surface, and the second surface including an aperture.

19. The package of claim 17 wherein the slot comprises a surface having a first etched region and a second etched region, the first and second etched regions dividing the surface into a first surface, a second surface, and a third surface, and the third surface including an aperture.

20. A package comprising:
a substrate having a floor;
a first optical element coupled to the substrate;
a second optical element; and
a flexure coupled to the second optical element and the substrate to maintain the second optical element in optical alignment with the first optical element, the flexure including a body with a circular segment shape and a pair of front legs, the flexure also including a pair of rear legs that are attached to the substrate, the attachment of the rear legs causing the flexure to move from a first flexure position to a second flexure position, the distance between the first flexure position and the second flexure position equaling an offset distance, the body of the flexure having a specified length chosen such that the offset distance causes a second offset distance of the second optical component held by the flexure which is within a specified range, the second offset distance equal to the distance between a primary second optical component position and a secondary second optical component position, and wherein at least one leg includes an aperture in the form of a slot.

21. The package of claim 20 wherein the body includes a pair of alignment apertures.

22. The package of claim 20 further comprising an optical component holder.

23. The package of claim 22 wherein the optical component holder is a fiber groove.

24. The package of claim 20 further comprising a platform mounted on top of the body of the flexure, the platform shorter in length than the body of the flexure.

25. A package comprising:
a substrate having a floor;
a first optical element coupled to the substrate;
a second optical element; and
a flexure coupled to the second optical element and the substrate to maintain the second optical element in optical alignment with the first optical element, the flexure including a trapezoidal shaped body and a pair of front legs, the flexure also including a pair of rear legs that are attached to the substrate after the attachment of the front legs to the substrate, the attachment of the rear legs causing the flexure to move from a first flexure position to a second flexure position, the distance between the first flexure position and the second flexure position equaling an offset distance, the body of the flexure having a specified length chosen such that the offset distance causes a second offset distance of the second optical component held by the flexure which is within a specified range, the second offset distance equal to the distance between a primary second optical component position and a secondary second optical component position, and wherein at least one leg includes an aperture in the form of a slot.

26. The package of claim 25 wherein the body includes a pair of alignment apertures.

27. The package of claim 25 further comprising an optical component holder.

28. The package of claim 27 wherein the optical component holder is a fiber groove.

29. The package of claim 25 further comprising a platform mounted on top of the body of the flexure, the platform shorter in length than the body of the flexure.

* * * * *